United States Patent
Miyazaki et al.

(10) Patent No.: US 8,375,736 B2
(45) Date of Patent: Feb. 19, 2013

(54) REFRIGERATION CYCLE APPARATUS

(75) Inventors: Kazuma Miyazaki, Nagoya (JP);
Yoshikatsu Sawada, Kariya (JP);
Yasutane Hijikata, Nagoya (JP);
Takeshi Wakisaka, Ichinomiya (JP);
Hiroyuki Nakaima, Kariya (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 973 days.

(21) Appl. No.: 12/428,113

(22) Filed: Apr. 22, 2009

(65) Prior Publication Data

US 2009/0260375 A1 Oct. 22, 2009

(30) Foreign Application Priority Data

Apr. 22, 2008 (JP) ................................. 2008-111097

(51) Int. Cl.
*F25B 27/00* (2006.01)
(52) U.S. Cl. ........................................ 62/238.6; 62/127
(58) Field of Classification Search .................... 62/127, 62/228.1, 228.3, 230, 238.6
See application file for complete search history.

(56) References Cited

U.S. PATENT DOCUMENTS

| 7,025,572 B2 * | 4/2006 | Miyagawa et al. ............ 417/223 |
| 2003/0131612 A1 * | 7/2003 | Wakisaka et al. ................ 62/133 |
| 2004/0211204 A1 * | 10/2004 | Matsubara et al. ........... 62/228.1 |
| 2007/0264131 A1 * | 11/2007 | Ota et al. ......................... 417/43 |

FOREIGN PATENT DOCUMENTS

| JP | 62-83215 | 4/1987 |
| JP | 2003-278663 | 10/2003 |
| JP | 2004-175290 | 6/2004 |
| JP | 2004-211663 | 7/2004 |
| JP | 2006-272982 | 10/2006 |

* cited by examiner

*Primary Examiner* — Melvin Jones
(74) *Attorney, Agent, or Firm* — Oblon, Spivak, McClelland, Maier & Neustadt, L.L.P.

(57) ABSTRACT

A refrigeration cycle apparatus includes a compressor, a condenser, a pressure-reducing mechanism, an evaporator, an orifice provided in a refrigerant flow path from the compressor to the pressure-reducing mechanism, a differential pressure sensor that detects the differential pressure before and after the orifice, a refrigerant flowrate calculating portion that calculates a refrigerant flowrate based on the differential pressure, and a torque estimating portion that estimates the torque required to drive the compressor based on the refrigerant flowrate calculated by the refrigerant flowrate calculating portion, the intake pressure of the compressor, and the discharge pressure of the compressor.

22 Claims, 11 Drawing Sheets

REFRIGERATION CYCLE APPARATUS

INCORPORATION BY REFERENCE

The disclosure of Japanese Patent Application No. 2008-111097 filed on Apr. 22, 2008, including the specification, drawings and abstract is incorporated herein by reference in its entirety.

BACKGROUND OF THE INVENTION

1. Field of the Invention

The invention relates to a refrigeration cycle apparatus. More particularly, the invention relates to technology that estimates the torque required to drive a compressor provided in a refrigeration cycle apparatus.

2. Description of the Related Art

A refrigeration cycle apparatus for air-conditioning a vehicle typically includes a compressor that compresses refrigerant, a condenser, a receiver (i.e., a gas-liquid separator), an expansion valve (i.e., a pressure-reducing mechanism), and an evaporator. The compressor, the condenser, the receiver, the expansion valve, and the evaporator are connected in a loop by refrigerant piping. Refrigerant discharged from the compressor flows to the condenser, from the condenser to the receiver, from the receiver to the expansion valve, and from the expansion valve to the evaporator, after which it is drawn back into the compressor.

Incidentally, when driving the compressor using an engine mounted in the vehicle, the compressor becomes a load on the engine so the engine requires extra energy to drive the compressor. Therefore, in order to reduce the fuel consumption of the vehicle, the output of the engine must be controlled based on the operating state of the compressor that becomes an engine load. That is, the torque required to drive the compressor is taken into account and the engine output is controlled to generate that much extra torque. For example, when the engine is idling, engine output control such as idle-up control is performed in which the engine speed is increased just enough to generate the amount of extra torque required to drive the compressor. Therefore, when driving the compressor using the engine, it is important to accurately estimate the torque required to drive the compressor.

The torque required to drive the compressor can be estimated based on the refrigerant flowrate and the discharge and intake pressures of the compressor, as is described in Japanese. Patent Application Publication No. 2004-175290 (JP-A-2004-175290), for example. Also, a flowrate control valve is provided in the high pressure region of the refrigeration cycle apparatus (i.e., in the region between the discharge port of the compressor and the inlet of the expansion valve), and the torque required to drive the compressor is estimated based on a refrigerant flowrate determined by an indicated value (i.e., a current value) of this flowrate control valve (i.e., an indicated flowrate).

However, with a structure in which the torque required to drive the compressor is estimated based on an indicated flowrate according to an indicated value of a flowrate control valve as described above, there may be a difference between the indicated flowrate and the actual refrigerant flowrate during a transition when, for example, the intake pressure of the compressor fluctuates due to a change in the temperature in the evaporator or the like, or when the indicated value changes. As a result, the torque may not be able to be accurately estimated. Also, a difference may also occur between the indicated flowrate and the actual refrigerant flowrate due to a change in the characteristics of the flowrate control valve or the like. Moreover, during startup of the compressor, the actual refrigerant flowrate does not increase until the refrigerant accumulated in a control pressure chamber has all been discharged, so there is a difference between the indicated flowrate and the actual refrigerant flowrate during this time. Incidentally, also in the refrigeration cycle apparatus of the related art described above, the torque required to drive the compressor is estimated using the refrigerant flowrate determined by the current value supplied to a capacity control valve of the compressor, so a similar problem may occur in a case such as that described above.

SUMMARY OF THE INVENTION

This invention thus provides a refrigeration cycle apparatus capable of accurately estimating the torque required to drive a compressor.

One aspect of the invention relates to a refrigeration cycle apparatus that includes a compressor which compresses and discharges refrigerant that has been drawn in the compressor; a condenser that condenses the refrigerant discharged from the compressor; a pressure-reducing mechanism that reduces the pressure of the refrigerant from the condenser by expanding the refrigerant; an evaporator that evaporates the refrigerant from the pressure-reducing mechanism; an orifice formed in a refrigerant flow path from the compressor to the pressure-reducing mechanism in the refrigeration cycle apparatus; a differential pressure sensor that detects differential pressure before and after the orifice; a refrigerant flowrate calculating portion that calculates a refrigerant flowrate based on the differential pressure detected by the differential pressure sensor; and a torque estimating portion that estimates the torque required to drive the compressor based on the refrigerant flowrate calculated by the refrigerant flowrate calculating portion, the intake pressure of the compressor, and the discharge pressure of the compressor.

According to this aspect, when the refrigerant flowrate changes, that change is detected as a change in the differential pressure before and after the orifice. The refrigerant flowrate is calculated based on the differential pressure before and after the orifice, which is directly detected by the differential pressure sensor, so the amount of fluctuation in the actual refrigerant flowrate can quickly be reflected in the calculation results of the refrigerant flowrate. As a result, the refrigerant flowrate can still be accurately detected even if it suddenly fluctuates. Using the thus calculated refrigerant flowrate to estimate the torque required to drive the compressor enables that torque to be accurately estimated even when the actual refrigerant flowrate suddenly fluctuates when the intake pressure of the compressor fluctuates and during startup of the compressor.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the present invention will be described in greater detail below with reference to the accompanying drawings. Hereinafter, an example will be described in which the invention is applied to a refrigeration cycle apparatus used in an air-conditioning system for a vehicle.

Figure 1:
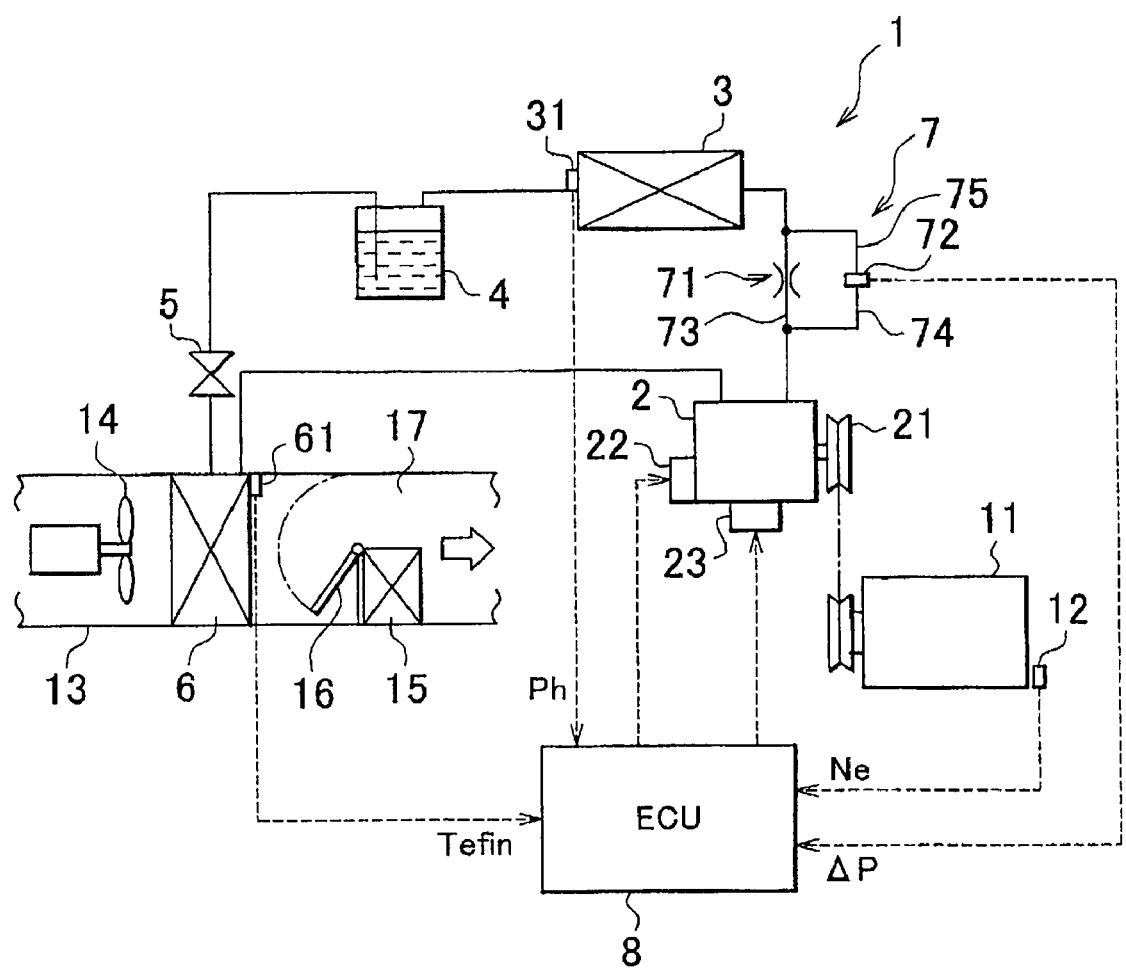
FIG. 1 is a schematic view showing a frame format of the general structure of a refrigeration cycle apparatus for air-conditioning a vehicle according to an example embodiment of the invention.
Figure 2:
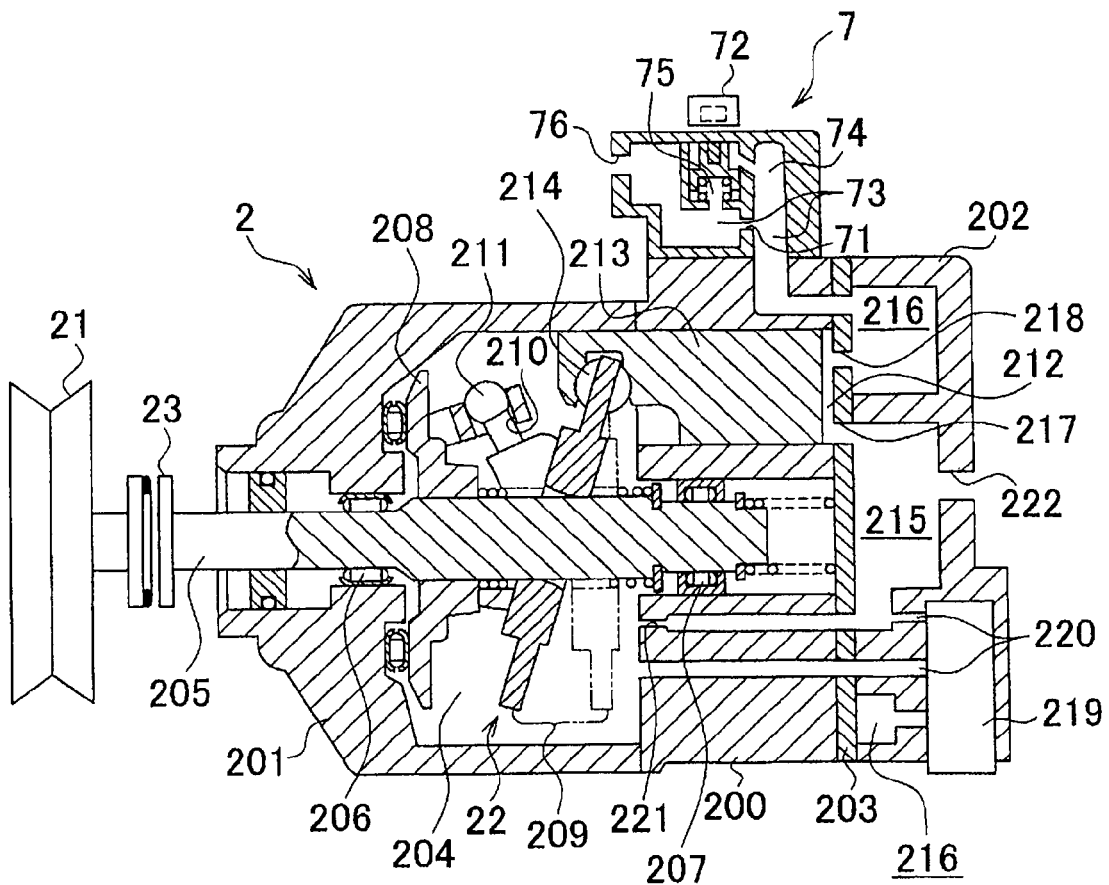
FIG. 2 is a sectional view of a compressor used in the refrigeration cycle apparatus according to the example embodiment.
Figure 3A:
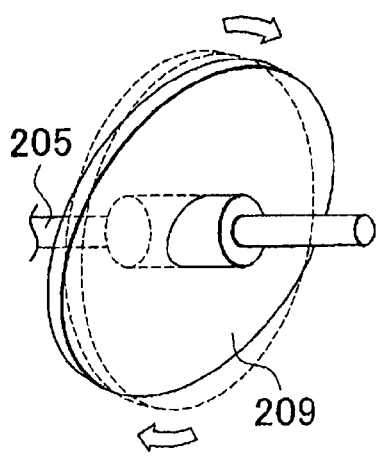
FIG. 3A is a perspective view of a swash plate, which is arranged in the compressor shown in FIG. 2, tilted to the maximum angle to achieve maximum discharge capacity.
Figure 3B:
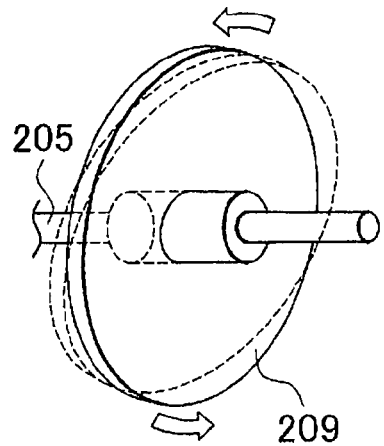
FIG. 3B is a perspective view of the swash plate, which is arranged in the compressor shown in FIG. 2, tilted to the minimum angle to achieve minimum discharge capacity.
Figure 4:
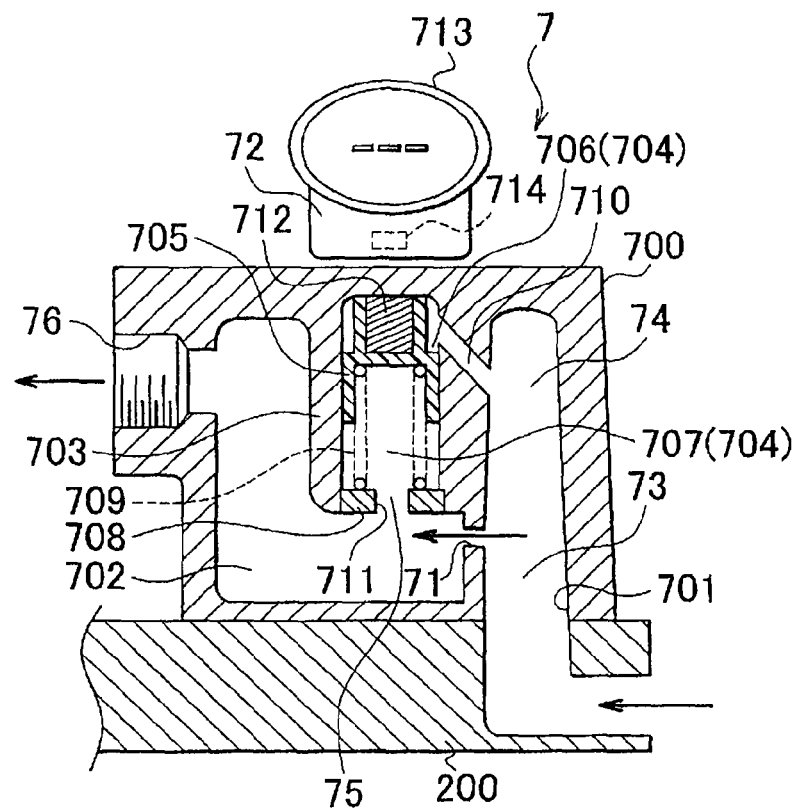
FIG. 4 is an enlarged sectional view of a differential pressure detecting mechanism according to the example embodiment.
Figure 5:
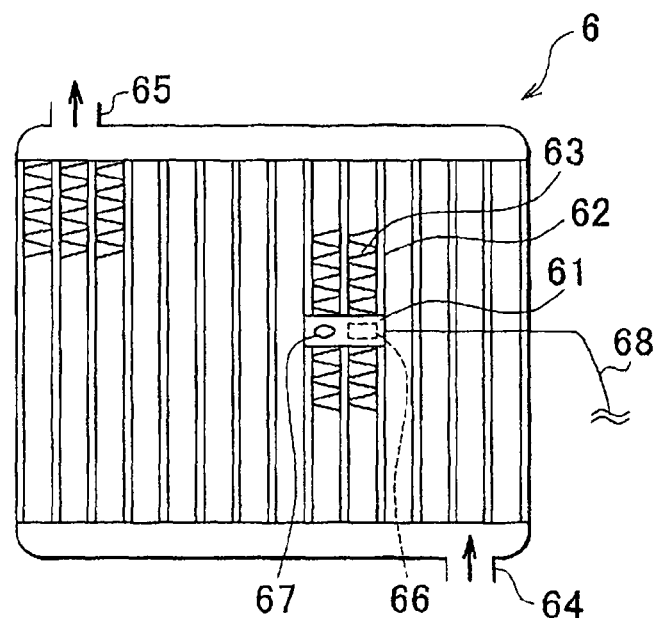
FIG. 5 is a front view of an evaporator and a temperature sensor mounted on the evaporator according to the example embodiment.

FIG. 1 is a schematic view showing a frame format of the general structure of a refrigeration cycle apparatus for air-conditioning a vehicle according to an example embodiment. FIG. 2 is a sectional view of a compressor used in the refrigeration cycle apparatus according to the example embodiment. FIG. 3A is a perspective view of a swash plate, which is arranged in the compressor shown in FIG. 2, tilted to the maximum angle to achieve maximum discharge capacity, and FIG. 3B is a perspective view of the swash plate, which is arranged in the compressor shown in FIG. 2, tilted to the minimum angle to achieve minimum discharge capacity. FIG. 4 is an enlarged sectional view of a differential pressure detecting mechanism according to the example embodiment, and FIG. 5 is a front view of an evaporator and a temperature sensor mounted on the evaporator according to the example embodiment.

As shown in FIG. 1, the refrigeration cycle apparatus 1 for air-conditioning a vehicle includes a compressor 2 that compresses refrigerant, a condenser 3, a receiver (i.e., a gas-liquid separator) 4, an expansion valve (i.e., a pressure-reducing mechanism) 5, and an evaporator 6. In this refrigeration cycle apparatus 1, the compressor 2, the condenser 3, the receiver 4, the expansion valve 5, and the evaporator 6 are connected in a loop by refrigerant piping. The refrigerant discharged from the compressor 2 flows to the condenser 3, then from the condenser 3 to the receiver 4, from the receiver 4 to the expansion valve 5, and from the expansion valve 5 to the evaporator 6, after which it is drawn back into the compressor 2. Also, a differential pressure detecting mechanism 7 is provided between the compressor 2 and the condenser 3.

Also, an inside/outside air switching door, not shown, is rotatably arranged in an inside/outside air switching box in an air-conditioning case 13. This inside/outside air switching door can be switched between an inside air mode which introduces inside air (air in the vehicle cabin) back into the vehicle cabin through an inside air outlet, and an outside air mode which introduces outside air (air outside the vehicle cabin) into the vehicle cabin through an outside air outlet. A blower 14 that blows air into the cabin is arranged downstream of the inside/outside switching box. The evaporator 6 described above is arranged downstream of the blower 14. This evaporator 6 cools the air flowing inside the air passage. That is, the evaporator 6 is a heat exchanger for cooling, which cools the air that is blown by the blower 14.

Also, a heater core 15 that heats the air cooled by the evaporator 6 is arranged downstream of the evaporator 6. This heater core 15 is a heat exchanger for heating, which heats the air that has passed through the evaporator 6 using the coolant or the like from the engine 11 as a heat source. A bypass passage 17 that allows the air to flow around (i.e., bypass) the heater core 15 is formed to one side of the heater core 15.

An air mix door 16 is rotatably arranged between the evaporator 6 and the heater core 15. This air mix door 16 is driven by a servo motor, for example, and is able to adjust the amount of air that flows through the heater core 15 (i.e., the hot air amount) and the amount of air that flows through the bypass passage 17 and bypasses the heater core 15 (i.e., cold air amount) by adjusting the opening amount of the air mix door 16. Accordingly, the temperature of the air blown out into the cabin is able to be adjusted. Also, various outlets, not shown, such as a defroster outlet that blows out temperature-controlled air toward the windshield of the vehicle, a face outlet that blows out temperature-controlled air toward the upper body of an occupant, and a foot outlet that blows out temperature-controlled air toward the feet of an occupant, are provided at the downstream-most portion of the air passage of the air-conditioning case 13.

As shown in FIGS. 1 and 2, the compressor 2 is driven by the engine 11 mounted in the vehicle. The compressor 2 has an electromagnetic clutch 23 for selectively allowing or interrupting the transmission of power. Power from the engine 11 is transmitted to the compressor 2 via a V-belt and a pulley 21 and the electromagnetic clutch 23. Power to the electromagnetic clutch 23 is switched on and off by an electronic control unit (ECU) 8. When the power to the electromagnetic clutch 23 is turned on, the electromagnetic clutch 23 engages, such that the compressor 2 operates. When the power to the electromagnetic clutch 23 is turned off, the electromagnetic clutch 23 disengages, such that the compressor 2 stops. Incidentally, an engine speed sensor 12 that detects the engine speed Ne is provided in the engine 11 and is connected to the ECU 8.

Also, the compressor 2 has a variable capacity mechanism 22 which variably controls the discharge capacity of the compressor 2 according to a command from the ECU 8. The variable capacity mechanism 22 is able to continuously change the discharge capacity of the compressor 2 within a range between approximately 0 and 100%. The variable capacity mechanism 22 is formed by an electromagnetic valve mechanism, for example, and the discharge capacity of the compressor 2 is controlled by a control current supplied to the electromagnetic valve mechanism. For example, the variable capacity mechanism 22 controls the discharge capacity in proportion to the control current supplied to the electromagnetic valve mechanism, with the discharge capacity becoming smaller as the control current becomes smaller. Next, the specific structure of the compressor 2 will be described with reference to FIG. 2. A front housing 201 is connected to the front end of a cylinder block 200, and a rear housing 202 is connected via a valve plate 203 to the rear end of the cylinder block 200. The cylinder block 200, the front housing 201, and the rear housing 202 together form a housing of the compressor 2.

A rotating shaft portion 205 is rotatably supported via radial bearings 206 and 207 by the cylinder block 200 and the front housing 201 which define a control pressure chamber 204. The electromagnetic clutch 23 is provided at the tip end of the rotating shaft portion 205 that protrudes out of the front housing 201 from the control pressure chamber 204. Also, the power from the engine 11 is transmitted to the pulley 21 by the V-belt that is wound around the pulley 21. Furthermore, the rotational force transmitted to the pulley 21 is then transmitted to the rotating shaft portion 205 via the electromagnetic clutch 23, thereby causing the rotating shaft portion 205 to rotate.

A support 208 is integrally fixed to the rotating shaft portion 205. Also, a swash plate 209 is supported on the rotating shaft portion 205 so as to be able to tilt and slide in the axial direction of the rotating shaft portion 205. A guide pin 211 provided with the swash plate 209 is slidably inserted into a guide hole 210 formed in the support 208. This link between the guide hole 210 and the guide pin 211 enables the swash plate 209 to rotate together with the rotating shaft portion 205 and tilt in the axial direction of the rotating shaft portion 205. The tilting of the swash plate 209 is guided by the slide-guide relationship between the guide hole 210 and the guide pin 211, and the slide-support action of the rotating shaft portion 205.

As the center portion of the swash plate 209 moves toward the support 208, the tilt angle of the swash plate 209 increases. The maximum tilt angle of the swash plate 209 is defined by abutment of the swash plate 209 against the support 208. The swash plate 209 shown by the solid line in FIG. 2 is at the maximum tilt angle. The swash plate 209 shown by the alternate long and two short dashes line in the same drawing is at the minimum tilt angle.

Pistons 213 are housed in a plurality of cylinder bores 212 bored in the cylinder block 200. Rotary movement of the swash plate 209 is converted, via shoes 214, to make the pistons 213 move in a reciprocal manner in the axial direction of the rotating shaft portion 205, such that the pistons 213 move back and forth in the cylinder bores 212.

A suction chamber 215 and a discharge chamber 216 are formed inside the rear housing 202. An inlet 222 for introducing refrigerant which is in a gaseous state at low pressure from the evaporator 6 into the compressor 2 is formed in the rear end of the rear housing 202. A conduit that communicates the compressor 2 with the evaporator 6 is connected to the inlet 222. Also, an intake port 217 and a discharge port 218 are formed in the valve plate 203. Moreover, an intake valve, not shown, that only allows refrigerant to flow in is formed in the intake port 217 of the valve plate 203. Also, a discharge valve that only allows refrigerant to flow out is formed in the discharge port 218 of the valve plate 203. The refrigerant that is in the gaseous state at low pressure in the suction chamber 215 opens the intake valve and flows into cylinder bores 202 from the intake port 217 from the reciprocating action of the pistons 213 (i.e., from the pistons 213 moving from right to left in FIG. 2). The gaseous refrigerant that has flowed into the cylinder bores 202 is then compressed to a high pressure by the reciprocating action of the pistons 213 (i.e., by the pistons 213 moving from left to right in FIG. 2) and opens the discharge valve and is discharged into the discharge chamber 216 through the discharge port 218.

An electromagnetic capacity control valve 219 is mounted to the rear housing 202. The capacity control valve 219 is interposed in a supply passage 220 that connects the discharge chamber 216 with the control pressure chamber 204. The valve opening amount of the capacity control valve 219 can be adjusted according to the pressure in the suction chamber 215 and the duty ratio of the current supplied to an electromagnetic solenoid, not shown, of the capacity control valve 219. When the valve hole of the capacity control valve 219 is closed, refrigerant in the discharge chamber 216 will not flow into the control pressure chamber 204.

The control pressure chamber 204 is communicated with the suction chamber 215 via a release passage 221. The refrigerant in the control pressure chamber 204 flows out into the suction chamber 215 via this release passage 221. When the valve opening amount of the capacity control valve 219 increases, the amount of refrigerant flowing from the discharge chamber 216 into the control pressure chamber 204 through the supply passage 220 increases, such that the pressure in the control pressure chamber 204 increases. Therefore, the tilt angle of the swash plate 209 with respect to the rotating shaft portion 205 decreases, as shown in FIG. 3B, and as a result, the discharge capacity decreases. On the other hand, when the valve opening amount of the capacity control valve 219 decreases, the amount of refrigerant flowing from the discharge chamber 216 into the control pressure chamber 204 through the supply passage 220 decreases, such that the pressure in the control pressure chamber 204 decreases. Therefore, the tilt angle of the swash plate 209 with respect to the rotating shaft portion 205 increases, as shown in FIG. 3A, and as a result, the discharge capacity increases.

Incidentally, the variable capacity mechanism 22 is a mechanism that is necessary to vary the amount of refrigerant discharged from the compressor 2. More specifically, the variable capacity mechanism 22 is made up of the swash plate 209, the guide hole 210, the guide pin 211, the capacity control valve 219 for adjusting the pressure within the control pressure chamber 204, the supply passage 220, and the release passage 221, all of which have been described with reference to FIG. 2.

The high temperature, high pressure gas refrigerant discharged from the compressor 2 structured as described above and introduced into the discharge chamber 216 is introduced into the condenser 3 via the differential pressure detecting mechanism 7.

Continuing on, the structure of this differential pressure detecting mechanism will now be described with reference to FIGS. 1 to 3. First, a general outline of the differential pressure detecting mechanism 7 will be described with reference to FIGS. 1 and 2. The general structure of the differential pressure detecting mechanism 7 includes an orifice 71, a differential pressure sensor 72, a main passage 73, a first detecting passage 74, and a second detecting passage 75. The orifice 71 (i.e., a differential pressure generating portion) is formed midway in the main passage 73 that communicates the compressor 2 with the condenser 3. Also, the upstream end of the first detecting passage 74 is connected to the main passage 73 upstream of the orifice 71. The downstream end of the first detecting passage 74 is connected to the differential pressure sensor 72. Also, the upstream end of the second detecting passage 75 is connected to the main passage 73 downstream of the orifice 71. The downstream end of the second detecting passage 75 is connected to the differential pressure sensor 72. Incidentally, an outlet 76 is formed in a position farthest downstream of the main passage 73 of the differential pressure detecting mechanism 7, and a conduit for connecting the condenser 3 with the differential pressure detecting mechanism 7 is connected to this outlet 76.

Now the differential pressure detecting mechanism 7 will be described in detail. As shown in FIG. 4, an inlet 701 into which flows gas refrigerant from the discharge chamber 216 of the compressor 2 is formed upstream of the orifice 71 in a spool housing 700. Also, a pressure introducing chamber 702 is formed in a position immediately downstream of the orifice, 71 in the spool housing 700, and a pressure detecting chamber 704 is formed by a cylindrical wall 703 the lower end of which is open, within the cylindrical wall 703. A spool member 705 is housed in the pressure detecting chamber 704. The pressure detecting chamber 704 is divided by the spool member 705 into a first pressure detecting chamber 706 which is positioned above in FIG. 4 and a second pressure detecting chamber 707 which is positioned below. A spring seat 708 is fitted into the opening at the lower end of the cylindrical wall 703, and a coil spring 709 is interposed between the spool member 705 and the spring seat 708. This coil spring 709 urges the spool member 705 in the direction from the second pressure detecting chamber 707 toward the first pressure detecting chamber 706.

The first detecting passage 74, which branches off from the main passage 73, is formed upstream of the orifice 71. A first communicating hole 710 formed in the cylindrical wall 703 communicates the first detecting passage 74 with the first pressure detecting chamber 706. Also, a second communicating hole 711 formed in the center portion of the spring seat 708 is formed downstream of the orifice 71. This second communicating hole 711 communicates the second pressure detecting chamber 707 with the pressure introducing chamber 702. Incidentally, the second communicating hole 711 formed in the center portion of the spring seat 708 corresponds to the second detecting passage 75.

A permanent magnet 712 is fixed to the spool member 705 by being press-fitted into a recessed portion formed in the upper portion of the spool member 705. A connector 713 is formed on the outer surface of the spool housing 700. Also, a magnetic sensor 714 is embedded in the connector 713 in a position facing the permanent magnet 712. The magnetic sensor 714 detects the magnetic flux density of the permanent magnet 712.

With this differential pressure detecting mechanism 7, the passage area of the main passage 73 is constricted by the orifice 71. Accordingly, a differential pressure corresponding to the refrigerant flowrate is produced before and after the orifice 71 by the gaseous refrigerant passing through the orifice 71. When this happens, the refrigerant pressure in the first pressure detecting chamber 706 becomes greater than the refrigerant pressure in the second pressure detecting chamber 707, causing the spool member 705 to move downward. As the spool member 705 moves, the permanent magnet 712 moves away from the magnetic sensor 714, and as a result, the magnetic flux density of the permanent magnet 712 detected by the magnetic sensor 714 changes. The differential pressure is detected by a change in the magnetic flux density which changes according to the differential pressure $\Delta P$ generated before and after the orifice 71 in this way. The differential pressure sensor 72 is connected to the ECU 8 and outputs a signal indicative of an output voltage related to the differential pressure $\Delta P$ before and after the orifice 71, which is detected by the differential pressure sensor 72, to the ECU 8.

Continuing on, the gas refrigerant introduced from the differential pressure detecting mechanism 7 to the condenser 3 condenses by releasing heat through heat exchange with outside air blown by a cooling fan, not shown. The high temperature, high pressure refrigerant that has been condensed by the condenser 3 is then introduced into the receiver 4. A high-pressure sensor 31 is provided immediately after the outlet of the condenser 3. This high-pressure sensor 31 detects the pressure (i.e., high pressure Ph) of the refrigerant flowing out from the outlet of the condenser 3. The high-pressure sensor 31 is connected to the ECU 8 and outputs a signal indicative of the detected high pressure Ph to the ECU 8. Here, the high pressure represents the refrigerant pressure in the refrigerant flow path from the compressor 2 to the expansion valve 5 via the condenser 3, and is higher than the refrigerant pressure in the refrigerant flow path from the expansion valve 5 to the compressor 2 via the evaporator 6. That is, the refrigerant pressure in the refrigerant flow path from the compressor 2 to the expansion valve 5 via the condenser 3 is high because the refrigerant has been compressed by the compressor 2, while the refrigerant pressure in the refrigerant flow path from the expansion valve 5 to the condenser 2 via the evaporator 6 is low because the refrigerant has been expanded by the expansion valve 5. Incidentally, the high-pressure sensor 31 may also be provided in the condenser 3.

Continuing on, the refrigerant introduced from the condenser 3 into the receiver 4 is separated into a liquid phase and a gas phase, and the liquid phase refrigerant (i.e., the liquid refrigerant) is stored in the receiver 4. The high-pressure gas refrigerant from the receiver 4 is rapidly expanded by the expansion valve 5 so that it changes to a gas-liquid two-phase state. The low-pressure coolant, the pressure of which has been decreased by the expansion valve 5, is introduced into the evaporator 6.

The evaporator arranged in the air-conditioning case 13 is structured such that corrugated fins 63 are arranged between a plurality of tubes 62 through which the refrigerant flows, as shown in FIG. 5. After the refrigerant that has flowed through the expansion valve 5 and into the evaporator 6 through an evaporator inlet 64, it flows through the tubes 62 and cools the corrugated fins 63. After flowing through the tubes 62, the refrigerant then flows out of the evaporator 6 through an evaporator outlet 65. Also, a temperature sensor 61 that detects the temperature of the fins of the evaporator 6 is provided. This temperature sensor 61 has a retaining protrusion 66 and a detecting portion 67. The retaining protrusion 66 and the detecting portion 67 of the temperature sensor 61 both protrude in the depth direction with respect to the surface of the paper on which FIG. 5 is drawn (i.e., in the direction away from a person viewing FIG. 5). The retaining protrusion 66 is inserted and retained between the corrugated fins 63, thereby fixing the temperature sensor 61 to the evaporator 6. Incidentally, when the temperature sensor 61 is fixed to the evaporator 6, the detecting portion 67 is in a position tucked between the corrugated fins 63 and detects a fin temperature Tefin of the corrugated fins 63. The temperature sensor 61 is connected to the ECU 8 by a harness 68 and outputs a signal indicative of the detected fin temperature Tefin of the evaporator 6 to the ECU 8. Incidentally, the temperature sensor 61 obtains the fin temperature Tefin at predetermined sampling intervals.

Incidentally, in the evaporator 6, the low-pressure refrigerant that is in the gas-liquid two-phase state absorbs heat from the air flowing through the air passage of the air-conditioning case 13, and as a result, evaporates (i.e., vaporizes) to become gas refrigerant. The gas refrigerant after evaporation is drawn back into the compressor 2 again where it is compressed.

The refrigeration cycle apparatus 1 structured as described above is controlled by the ECU 8 which serves as controlling means. The ECU 8 is an electrical control portion which is formed by a microcomputer that includes a CPU, ROM, and RAM and the like, and a peripheral circuit of the microcomputer, and performs various calculations and processing based on programs, maps, tables, and operational expressions and the like stored in the ROM. The ECU 8 receives detection signals from various sensors, which are necessary to perform various kinds of control of the refrigeration cycle apparatus 1.

Figure 6:
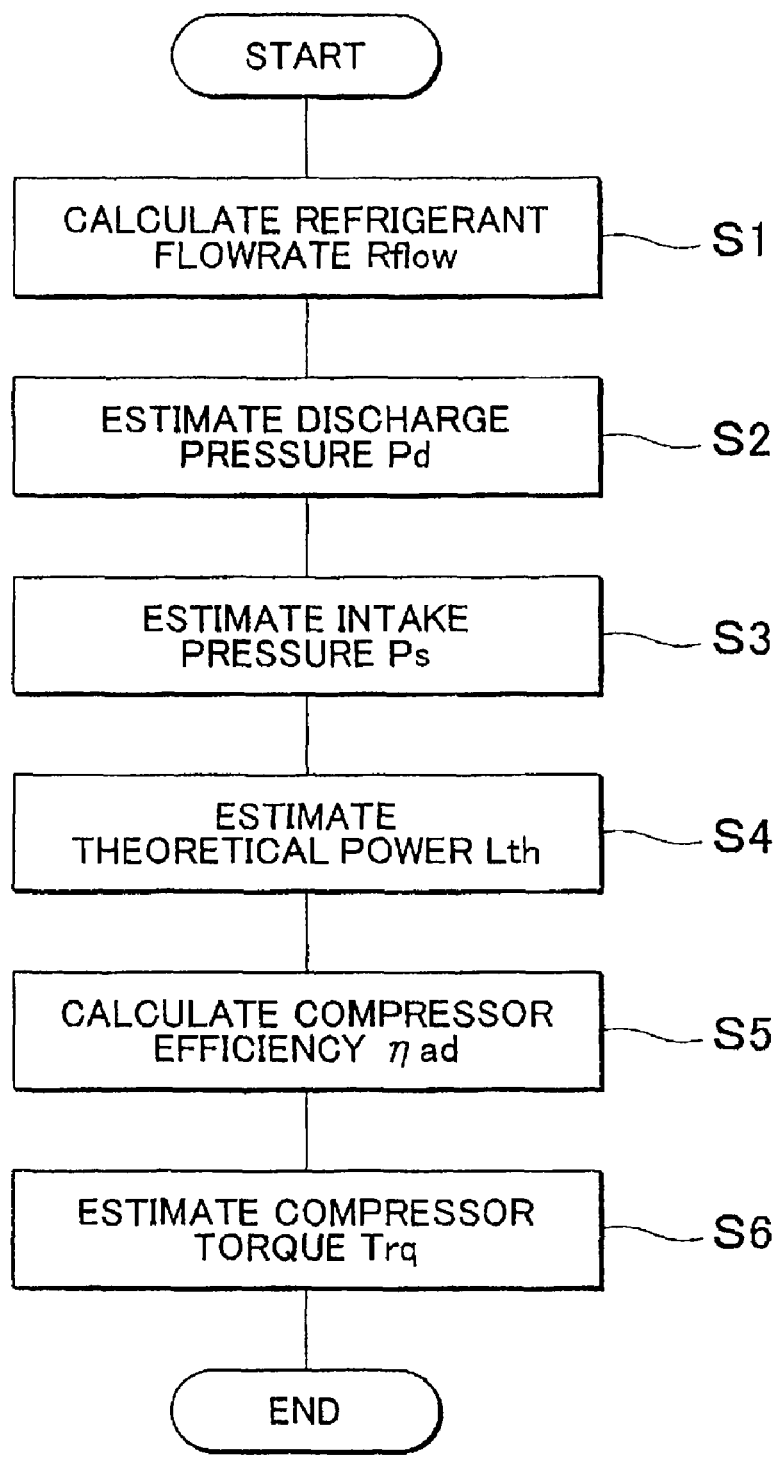
FIG. 6 is a flowchart illustrating a main routine of a torque estimating process of the compressor according to the example embodiment.
Figure 7:
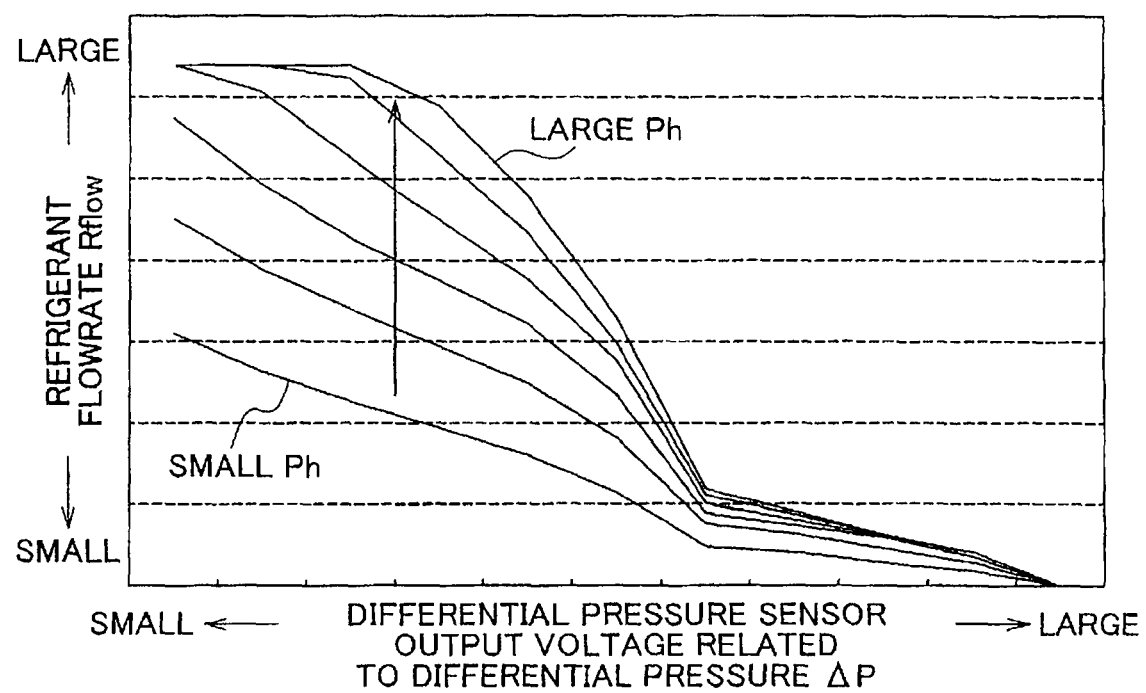
FIG. 7 is a view of a map for calculating the refrigerant flowrate from the differential pressure and high pressure.
Figure 8:
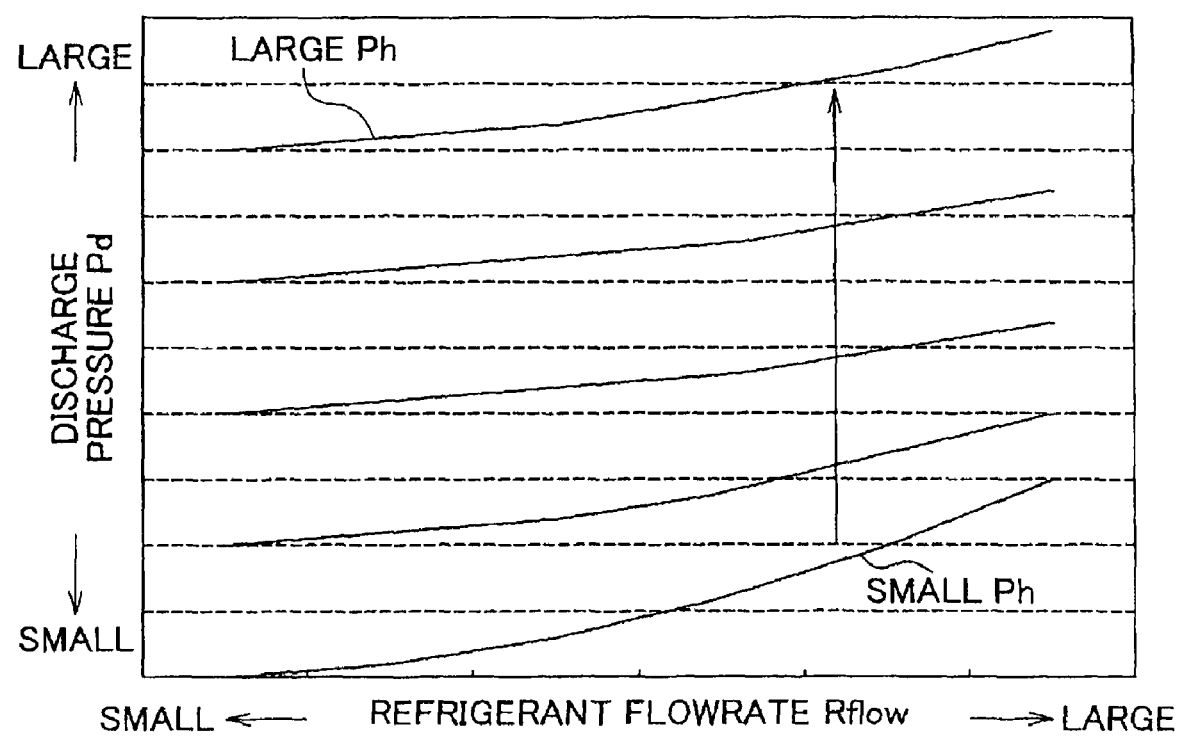
FIG. 8 is a view of a map for estimating the discharge pressure of the compressor from the refrigerant flowrate and the high pressure.
Figure 9:
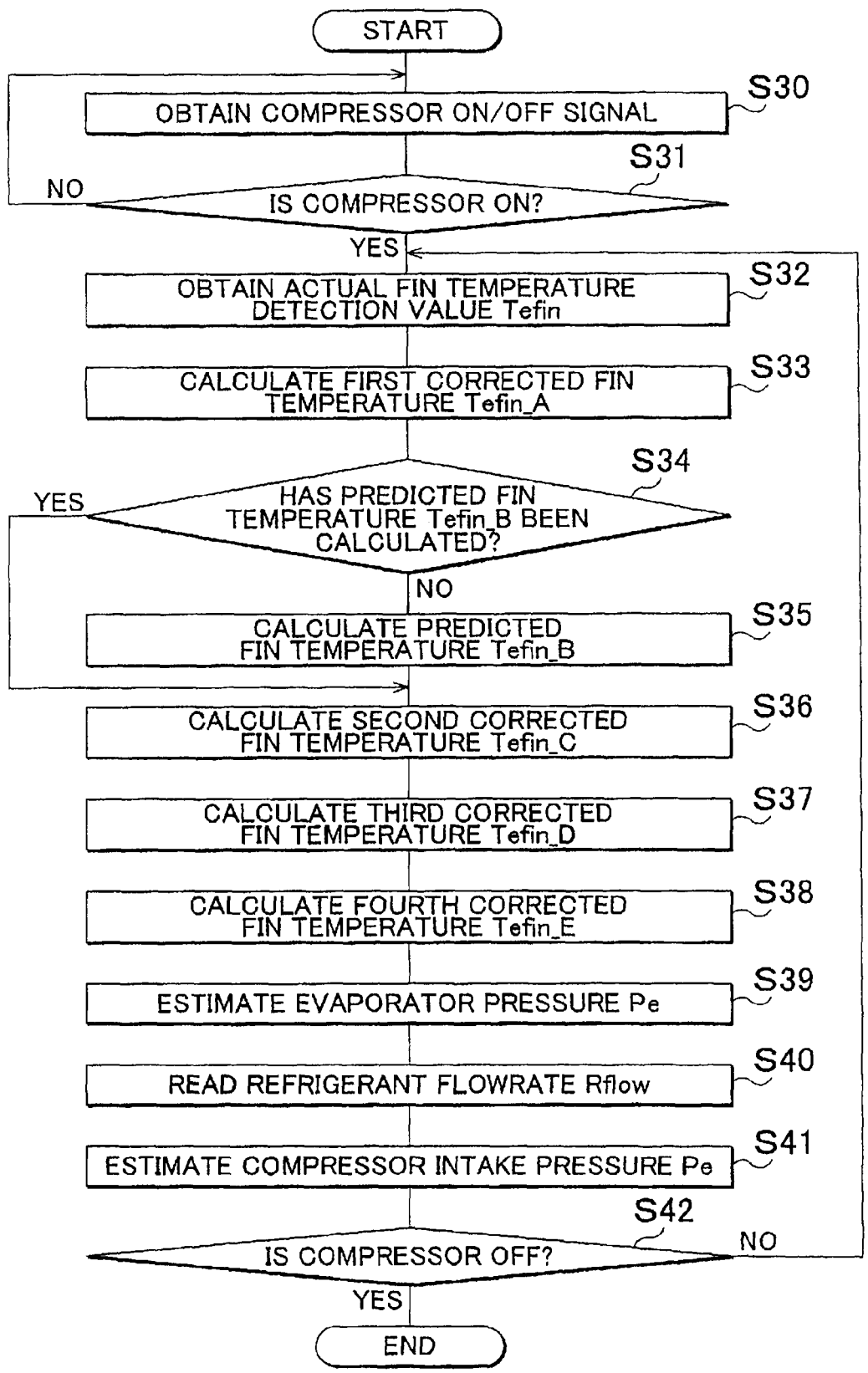
FIG. 9 is a flowchart illustrating a compressor intake pressure estimating process which is a subroutine in the torque estimating process in FIG. 6.
Figure 10:
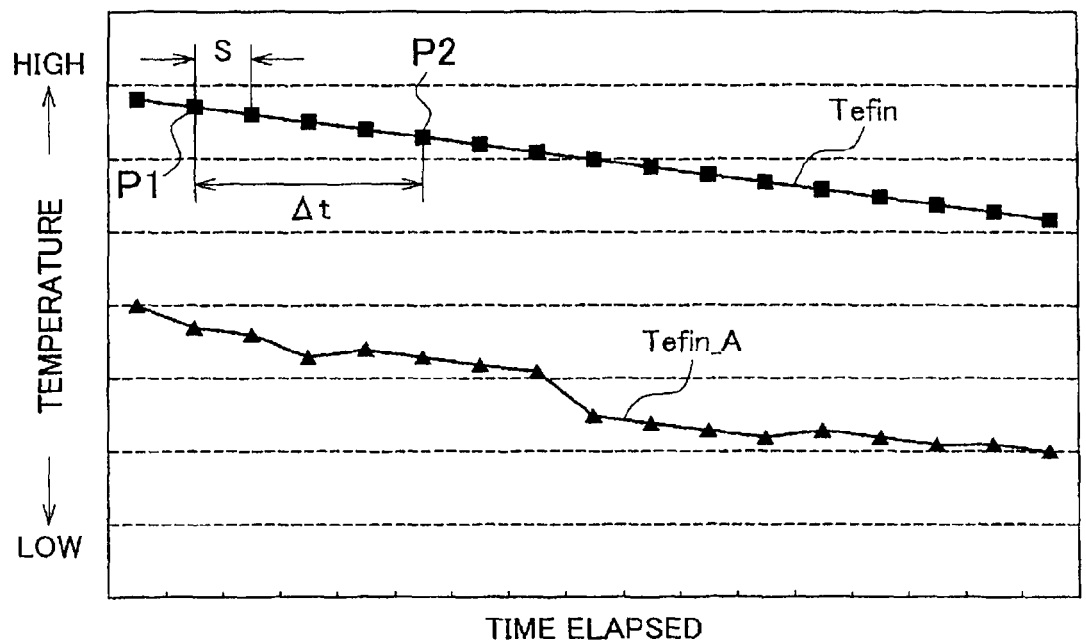
FIG. 10 is a graph illustrating a method for calculating a first corrected fin temperature from a fin temperature detection value.
Figure 11:
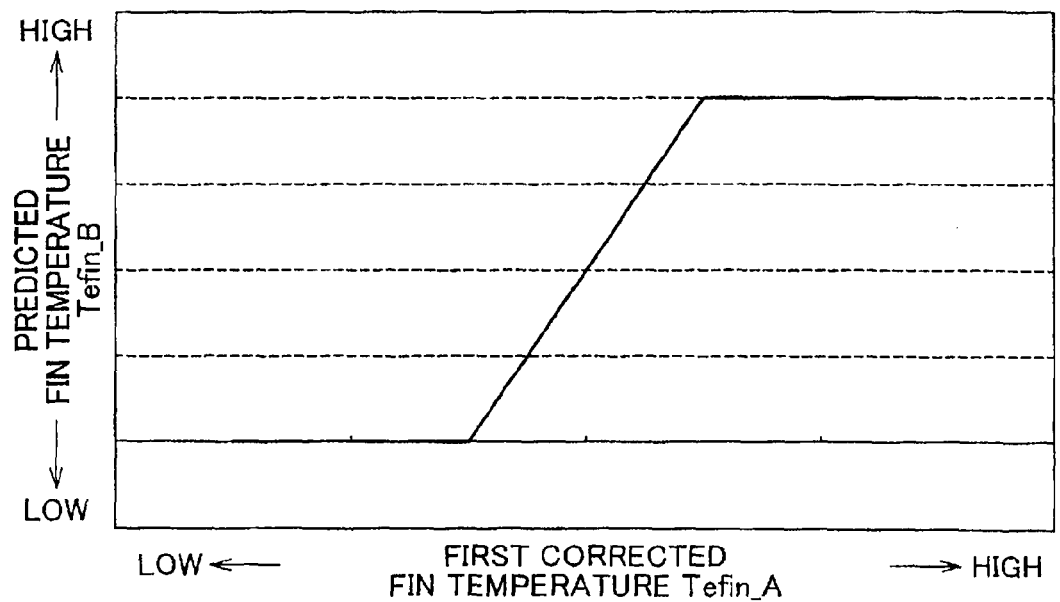
FIG. 11 is a view of a map for calculating a predicted fin temperature from the first corrected fin temperature.
Figure 12:
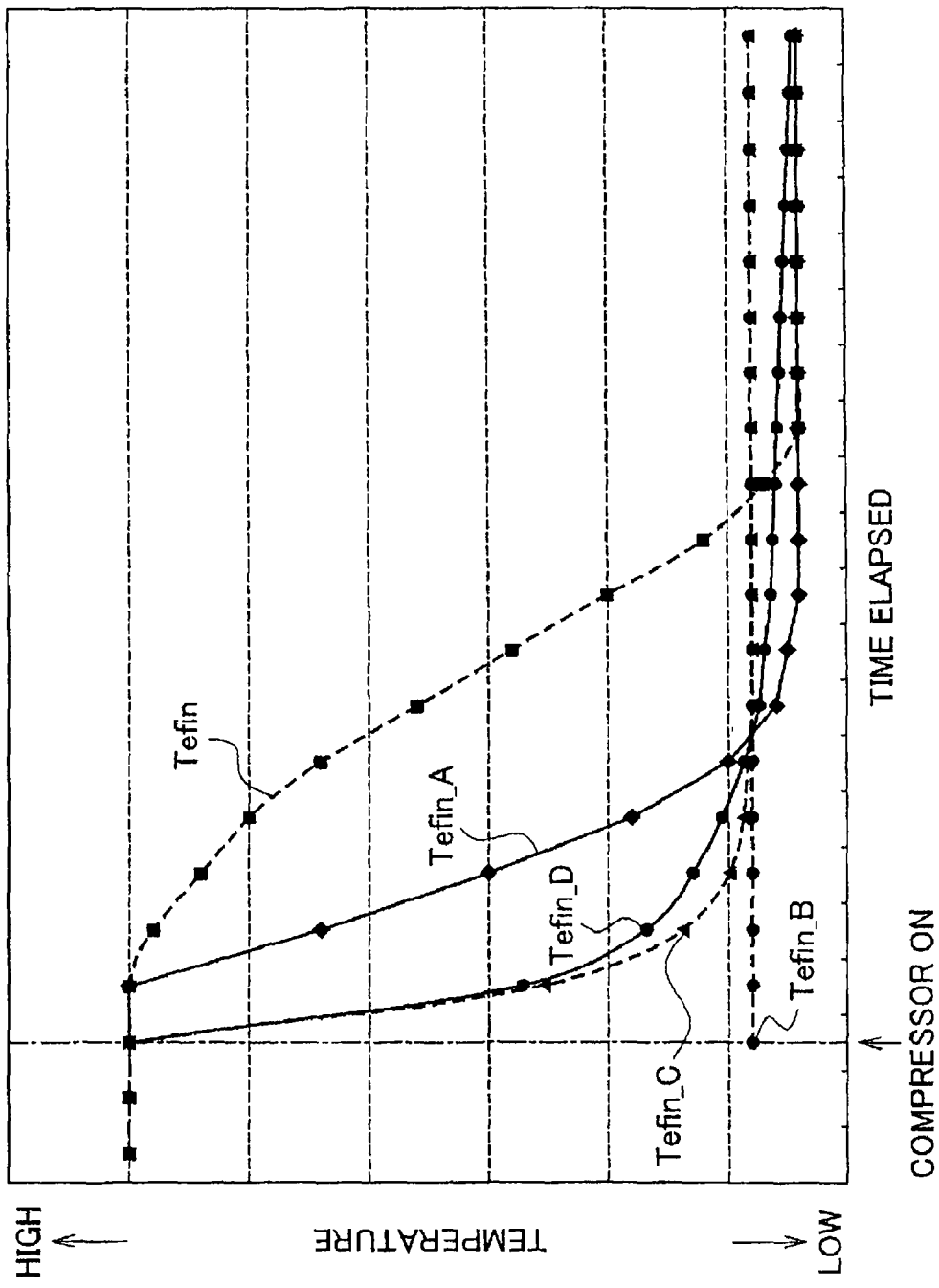
FIG. 12 is a graph showing the relationships among the fin temperature detection value, the first corrected fin temperature, the predicted fin temperature, a second corrected fin temperature, and a third corrected fin temperature.
Figure 13:
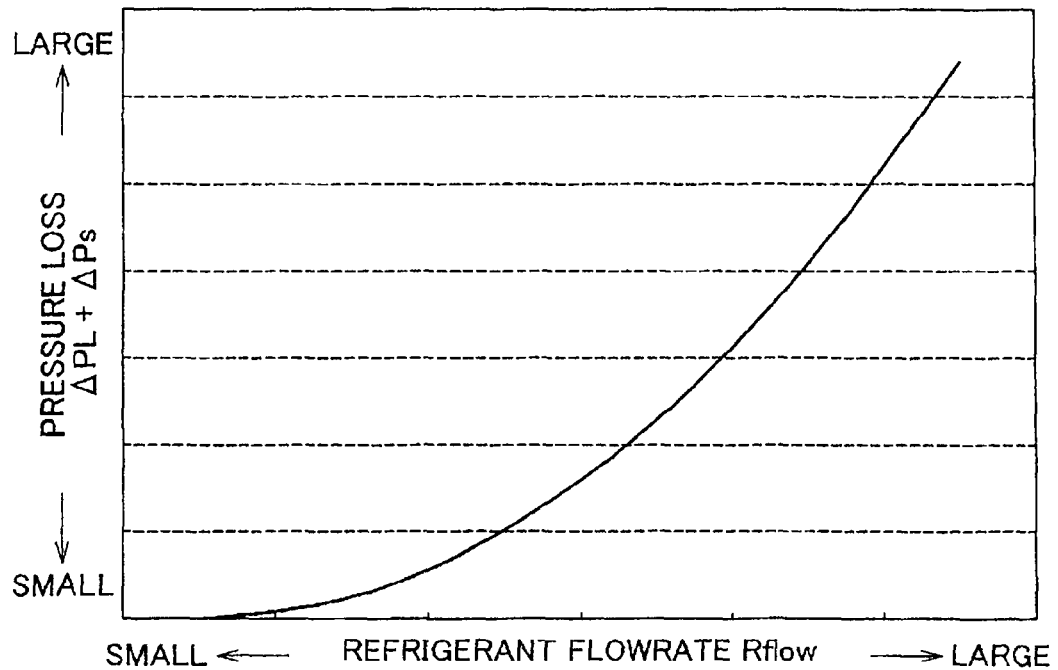
FIG. 13 is a view of a map for calculating the refrigerant flowrate and a pressure loss that occurs in a refrigerant flow path from the evaporator to the compressor.
Figure 14:
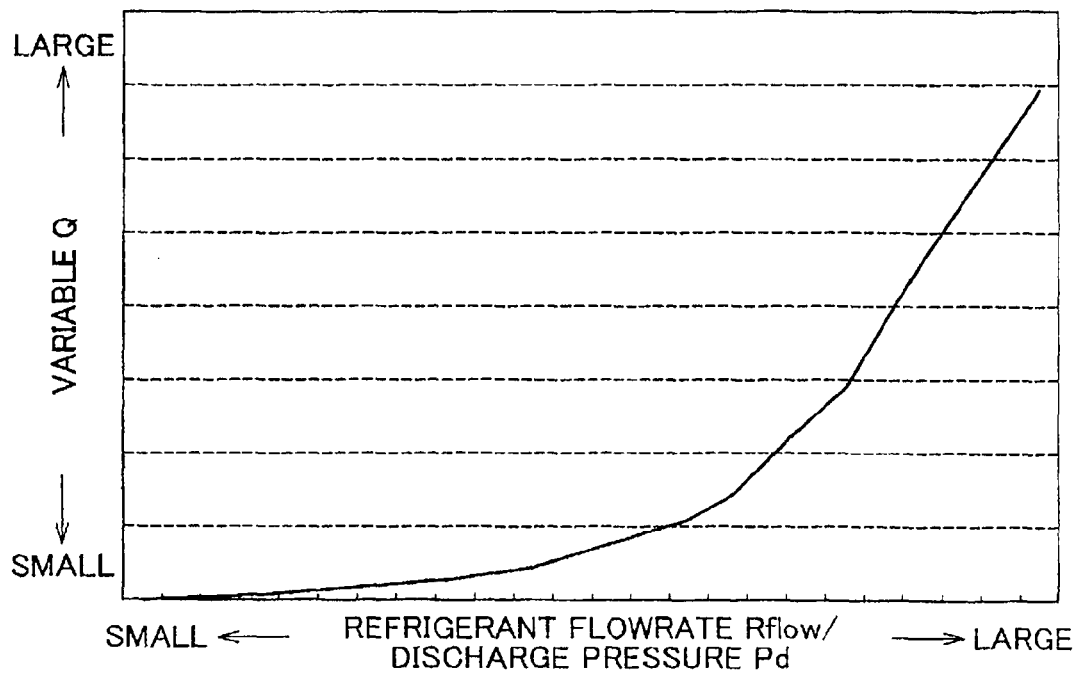
FIG. 14 is a view of a map for calculating a variable Q from the refrigerant flowrate and the discharge pressure.
Figure 15:
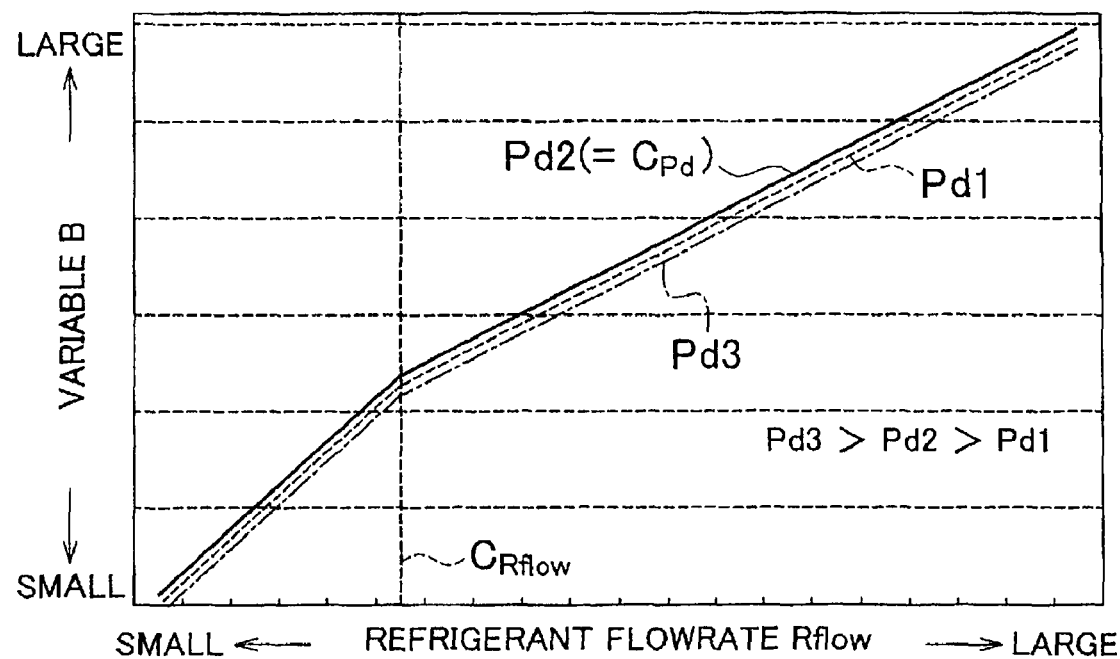
FIG. 15 is a view of a map for calculating another variable B from the refrigerant flowrate and the discharge pressure.

In this example embodiment, the ECU 8 performs torque estimation control that estimates the torque Trq required to drive the compressor 2, as will be described below. An example of this torque estimation control will now be described with reference to FIGS. 6 to 15. FIG. 6 is a flowchart illustrating one example of a main routine of a torque estimating process of the compressor 2. FIG. 7 is a view of a map for calculating the refrigerant flowrate Rflow from the differential pressure ΔP and high pressure Ph. FIG. 8 is a view of a map for estimating the discharge pressure of the compressor 2 from the refrigerant flowrate Rflow and the high pressure Ph. FIG. 9 is a flowchart illustrating a compressor intake pressure estimating process which is a subroutine in the torque estimating process in FIG. 6. FIG. 10 is a graph illustrating a method for calculating a first corrected fin temperature from a fin temperature detection value. FIG. 11 is a view of a map for calculating a predicted fin temperature from the first corrected fin temperature. FIG. 12 is a graph showing the relationships among the fin temperature detection value, the first corrected fin temperature, the predicted fin temperature, a second corrected fin temperature, and a third corrected fin temperature. FIG. 13 is a view of a map for calculating a refrigerant flowrate and a pressure loss that occurs in a refrigerant flow path from the evaporator to the compressor. FIG. 14 is a view of a map for calculating a variable Q from the refrigerant flowrate and the discharge pressure, and FIG. 15 is a view of a map for calculating another variable B from the refrigerant flowrate and the discharge pressure. Incidentally, the series of control processes described below is executed repeatedly by the ECU 8 in predetermined cycles.

First, the main routine of the torque estimation control shown in FIG. 6 will be described. First, as shown in step S1, the refrigerant flowrate is calculated. In this step, the refrigerant flowrate Rflow flowing before and after the orifice 71 of the differential pressure detecting mechanism 7 is calculated based on the output voltage of the differential pressure sensor 72 related to the differential pressure ΔP before and after the orifice 71 of the differential pressure detecting mechanism 7 and the high pressure Ph detected by the high-pressure sensor 31 of the condenser 3.

Next, in step S2, the discharge pressure Pd of the compressor 2 is estimated based on the refrigerant flowrate Rflow calculated in step S1 and the high-pressure Ph detected by the high-pressure sensor 31.

Next, in step S3, the intake pressure Ps of the compressor 2 is estimated based on the refrigerant flowrate Rflow calculated in step S1 and the evaporator pressure Pe which is the refrigerant pressure in the evaporator 6. Incidentally, the evaporator pressure Pe used in step S3 is basically estimated based on the fin temperature Tefin of the evaporator 6 detected by the temperature sensor 61 of the evaporator 6 and the ON/OFF signal of the compressor 2. A more detailed description of how the evaporator pressure Pe is estimated will be given later.

Next, in step S4, the theoretical power Lth, which is the theoretical power of the compressor 2, is estimated based on i) the refrigerant flowrate Rflow calculated in step S1, ii) the discharge pressure Pd of the compressor 2 estimated in step S2, and iii) the intake pressure Ps of the compressor 2 estimated in step S3.

Then in step S5, the compressor efficiency ηad is calculated based on i) the refrigerant flowrate Rflow calculated in step S1, ii) the discharge pressure Pd of the compressor 2 estimated in step S2, and iii) the compressor speed Nc calculated from the speed Ne of the engine 1.

Next, in step S6, the actual torque Trq required to drive the compressor 2 is estimated based on the theoretical power Lth of the compressor 2 estimated in step S4 and the compressor efficiency ηad calculated in step S5.

Next, steps S1 to S6 of the main routine shown in FIG. 6 will be described in detail.

First, the calculation of the refrigerant flowrate Rflow in step S1 will be described. In the calculation of the refrigerant flowrate Rflow in step S1, the refrigerant flowrate Rflow is calculated based on a map such as that shown in FIG. 7. In the map in FIG. 7, a curve is set for each detection value of a high pressure Ph. When the high pressure Ph is high, the curves toward the top on the map rather than the curves toward the bottom of the map are used. That is, a curve that is higher up on the map indicates a relationship between the output voltage related to the differential pressure ΔP and the refrigerant flowrate that is applied when the high pressure Ph is higher.

Also, in FIG. 7, the refrigerant flowrate Rflow increases more when the output voltage of the differential pressure sensor 72 is small than it does when the output voltage of the differential pressure sensor 72 is large. This is because the output voltage of the differential pressure sensor 72 is set to become lower as the spool member 705 moves downward by the differential pressure and the distance between the permanent magnet 712 and the magnetic sensor 714 increases (i.e., as the refrigerant flowrate becomes larger and the differential pressure ΔP before and after the orifice 71 increases).

Also, the reason for setting the curves so that the refrigerant flowrate Rflow increases as the high pressure Ph increases will now be described. The output voltage of the differential pressure sensor 72 indicates a physical quantity related to the volume flowrate of the gas refrigerant flowing through the orifice 71. However, the refrigerant flowing before and after the orifice 71 is in a gaseous state, so the density of the refrigerant differs greatly depending on the pressure in the refrigerant flow path downstream of the orifice 71 (i.e., the high pressure Ph near the condenser 3). Therefore, the physical quantity related to the volume flowrate, which is the output pressure of the differential pressure sensor 72, is converted into mass flowrate of the refrigerant flowing through the orifice 71 by correcting it with the high pressure Ph.

Next, the process for estimating the discharge pressure Pd of the compressor 2 performed in step S2 will be described in detail. In step S2, the discharge pressure Pd of the compressor 2 is obtained by a map based on Expression (1) below.

$$Pd = Ph + (K_1 \times Ph^2 - K_2 \times Ph + C_1)/10) \times Rflow^{1.6} \geq Pdmin \quad (1)$$

where Pd is the discharge pressure of the compressor 2, Ph is the high pressure Ph according to the high-pressure sensor 31, $K_1$, $K_2$, and $C_1$ are constants each of which is a different value, Rflow is the refrigerant flowrate calculated in step S1, and Pdmin is the lower limit value of the discharge pressure. FIG. 8 shows a map obtained by Expression (1) above. As shown in FIG. 8, the discharge pressure Pd is estimated to be larger as the high pressure Ph detected by the high-pressure sensor 31 increases, as is evident from the curves. Also, the discharge pressure Pd of the compressor 2 is estimated to be larger as the refrigerant flowrate Rflow calculated in step S1 becomes larger. The discharge pressure Pd obtained through this process of estimating the discharge pressure Pd in step S2 is a value that takes into account pressure loss (i.e., pressure loss in the condenser 3 and pipe pressure loss) that occurs in the refrigerant flow path from the discharge port of the compressor 2 to the location where the high pressure Ph is detected (i.e., the location of the high-pressure sensor 31). That is, the pressure loss increases as the refrigerant flowrate Rflow increases, so the discharge pressure Pd of the compressor 2 is corrected so that it becomes greater.

Here, a lower limit value Pdmin is preferably set for the discharge pressure Pd of the compressor 2 that is estimated as described above. The reason for this is that if the differential pressure sensor 72 malfunctions, for example, the error between the refrigerant flowrate Rflow calculated based on the detection output of the differential pressure sensor 72 and the actual refrigerant flowrate Rflow will increase and it will become difficult to accurately calculate the discharge pressure Pd of the compressor 2. In this case, the calculated discharge pressure Pd tends to be estimated lower than it actually is so setting the lower limit value Pdmin for the calculated discharge pressure Pd beforehand can prevent the reliability from decreasing.

Next, the process for estimating the intake pressure Pd of the compressor 2 that is performed in step S3 will be described in detail with reference to FIGS. 9 to 13. First, the flow of the process for estimating the intake pressure Pd of the compressor 2 involves the following steps, as shown in the subroutine in FIG. 9. That is, the ON/OFF signal from the compressor 2 relating to the starting and stopping of the compressor 2 is obtained in step S30. Then in step S31, it is determined based on the ON/OFF signal whether the compressor 2 has started. If the signal from the compressor 2 is an ON signal, it is determined that the compressor 2 has started and the process proceeds on to the next step, step S32. If, on the other hand, the signal from the compressor 2 is an OFF signal, it is determined that the compressor 2 is stopped and it is not necessary to calculate the compressor torque Trq so the process returns to step S30.

If the process has proceeded on to step S32, then the fin temperature detection value Tefin which is the actual detection value of the temperature sensor 61 of the evaporator 6 is obtained. More specifically, the temperature sensor 61 detects the fin temperature detection value Tefin at predetermined sampling intervals S, as shown in FIG. 10, Next, in step S33, a first corrected fin temperature Tefin_A is calculated from the fin temperature detection value Tefin obtained in step S32.

$$\text{Tefin\_}A = \text{Tefin} + T(\text{Tefin} - \text{Tefin\_old})/\Delta t \quad (2)$$

where Tefin_old is the fin temperature detection value at a predetermined timing indicated by P1 in FIG. 10, for example, Tefin is the fin temperature detection value a predetermined time Δt after P1, which is indicated by P2 in FIG. 10, and T is a time constant. Incidentally, the predetermined time Δt may also be a time interval at which the ECU 8 calculates the first corrected fin temperature. Incidentally, FIG. 10 shows the results from sequentially calculating Tefin_A based on Expression (2) as the fin temperature detection value Tefin is updated.

Calculating the first corrected fin temperature Tefin_A as shown in Expression (2) enables the first corrected fin temperature Tefin_A to be obtained as a fin temperature that takes into account a delay in the detection of the refrigerant temperature due to the heat capacity of the temperature sensor 61 itself that is provided on the evaporator 6, even during the initial startup stage of the compressor 2, as shown in the graph of the fin temperature detection value Tefin and the first corrected fin temperature Tefin_A of FIG. 12.

Next the process proceeds on to step S34 where it is determined whether a predicted fin temperature Tefin_B, which will be described later, has been calculated. Then, if it is determined in step S34 that the predicted fin temperature Tefin_B has not been calculated, it means that the compressor 2 has just been turned on and the predicted fin temperature Tefin_B has not yet been calculated so the process proceeds on to step S35 where the predicted fin temperature Tefin_B is calculated. The predicted fin temperature Tefin_B indicates how far the fin temperature will drop after a predetermined period of time has passed immediately after startup of the compressor 2. That is, before the compressor 2 starts up, the fin temperature Tefin of the evaporator 6 is around the atmospheric temperature inside the air-conditioning case 13 because refrigerant is not flowing to the evaporator 6 (or the current fin temperature Tefin is closer to the atmospheric temperature in the air-conditioning case 13 than the fin temperature Tefin immediately after the compressor last stopped, when the compressor 2 is stopped after being operated and then not started for a while). The predicted fin temperature Tefin_B indicates how far the fin temperature Tefin that is near the atmospheric temperature in the air-conditioning case 13 or has come close to the atmospheric temperature will drop when a predetermined period of time has passed immediately after current startup of the compressor 2. In step S35, in order to obtain the predicted fin temperature Tefin_B from the first corrected fin temperature Tefin_A obtained in step S33, it is calculated based on a map of the predicted fin temperature Tefin_B and the first corrected fin temperature Tefin_A determined based on testing beforehand, as shown in FIG. 11. In the map in FIG. 11, the predicted fin temperature Tefin_B is set to increase as the first corrected fin temperature Tefin_A increases. The reason for setting the predicted fin temperature Tefin_B this way is because the fin temperature will not decrease much after the predetermined period of time has passed immediately after startup of the compressor 2. Also, the predicted fin temperature Tefin_B (i.e., the dotted line with round markers) shown in FIG. 12 has been calculated from the first corrected fin temperature Tefin_A immediately after startup of the compressor 2. Incidentally, if it is determined predicted in step S34 that the fin temperature Tefin_B has already been calculated such that there is no need to calculate the predicted fin temperature Tefin_B in step S35, step S35 is skipped and the process proceeds on to step S36.

In step S36, a second corrected fin temperature Tefin_C is calculated based on Expression (3) below from the first corrected fin temperature Tefin_A obtained in step S33 and the predicted fin temperature Tefin_B obtained in step S35.

$$\text{Tefin\_}C = ((T/\Delta t - 1) \times \text{Tefin\_}C\_\text{old} + \text{Tefin\_}B)/(T/\Delta t) \quad (3)$$

where T is a time constant, Δt is a time interval at which the ECU 8 calculates the second corrected fin temperature, Tefin_C_old is the last value of the second corrected fin temperature Tefin_C, and Tefin_B is the predicted fin temperature. Incidentally, the first time that the second corrected fin temperature Tefin_C is calculated immediately after startup of the compressor 2, there is no last value Tefin_C_old of the second corrected fin temperature so the first corrected fin temperature Tefin_A is substituted for Tefin_C_old.

The meaning of this correction in step S36 will now be explained. The fin temperature of the evaporator 6 will not decrease immediately after startup of the compressor 2 due to the heat capacity of the evaporator 6 itself. Therefore, immediately after the compressor 2 starts up, there is a difference between the refrigerant temperature around the temperature sensor 61 and the first corrected fin temperature Tefin_A. Correcting the fin temperature of the temperature sensor 61 of the evaporator 6 in step S36 so that it decreases immediately after the compressor 2 starts up reduces the difference between the actual refrigerant temperature near the temperature sensor 61 and the actual fin temperature detection value Tefin of the temperature sensor that occurs due to the heat capacity of the evaporator 6 itself. This is evident when comparing the curve of the second corrected fin temperature Tefin_C (i.e., the dotted line with the triangular markers) in FIG. 12, in which the temperature is decrease-corrected immediately after the compressor 2 starts up, with the line of the first corrected fin temperature Tefin_A (i.e., the solid line with the diamond markers). Incidentally, after a given amount of time has passed after startup of the compressor 2, the second corrected fin temperature Tefin_C calculated in Expression (3) above converges on the predicted fin temperature Tefin_B, as shown in FIG. 12.

Next, in step S37, a third corrected fin temperature Tefin_D is calculated according to Expression (4) below from the first corrected fin temperature Tefin_A calculated in step S33 and the second corrected fin temperature Tefin_C calculated in step S36.

$$Tefin\_Ds = Tefin\_A + (Tefin\_C - Tefin\_A) \times K_3 \quad (4)$$

where $K_3$ is a gradually changing constant within a range of 0 to 1, being 1 immediately after the compressor 2 turns on and decreasing at a predetermined rate of change.

The reason for performing the correction in step S37 will now be described. As shown in FIG. 12, the second corrected fin temperature Tefin_C calculated in step S36 is a value obtained after correcting the detection delay of the temperature sensor 61 due to the heat capacities of both the evaporator 6 itself and the temperature sensor 61 itself in the initial startup stage of the compressor 2, and is therefore the actual fin temperature near the temperature sensor 61. However, when a given amount of time passes after the compressor 2 starts up, the first corrected fin temperature Tefin_A may be lower than the second corrected fin temperature Tefin_C that has converged on the same value as the predicted fin temperature Tefin_B determined immediately after startup of the compressor 2. Therefore, in step S37 the value is smoothed so that there is no discontinuity in the value due to the temperature difference between the first corrected fin temperature Tefin_A and the second corrected fin temperature Tefin_C. This is evident by the curve of the third corrected fin temperature Tefin_D (i.e., the solid line with the round markers) in FIG. 12 being positioned between the curve of the second corrected fin temperature Tefin_C (i.e., the dotted line with the triangular markers) and the curve of the first corrected fin temperature Tefin_A (i.e., the solid line with the diamond markers), and becoming a continuous curve which is near the curve of the second corrected fin temperature Tefin_C in the initial startup stage of the compressor 2 and approaches the first corrected fin temperature Tefin_A once a given amount of time has passed after startup of the compressor 2.

Then, in step S38, a fourth corrected fin temperature Tefin_E is calculated based on Expression (5) below from the first corrected fin temperature Tefin_A calculated in step S33 and the third corrected fin temperature Tefin_D calculated in step S37.

$$Tefin\_E = Min(Tefin\_A, Tefin\_D) \quad (5)$$

That is, the smaller of the first corrected fin temperature Tefin_A and the third corrected fin temperature Tefin_D is selected because after startup of the compressor 2, it is closer to the actual refrigerant temperature near the temperature sensor 61.

Next, the process proceeds on to step S39 in which the evaporator pressure Pe is estimated. In this step, the pressure Pe in the evaporator 6 is estimated based on Expression (6) from the fourth corrected fin temperature Tefin_E calculated in step S38.

$$Pe = K_4 \times Tefin\_E + C_2 \quad (6)$$

where $K_4$ and $C_2$ are constants of different values. The refrigerant in the evaporator 6 is in a gaseous state so it can be understood from Expression (6) above that the evaporator pressure Pe will increase if the refrigerant temperature is high. Therefore, if the temperature of the refrigerant near the evaporator 6 (or the temperature sensor 61) is known, the evaporator pressure Pe can be estimated. The evaporator pressure Pe is able to be estimated more accurately because it is estimated using the fourth corrected fin temperature Tefin_E that is near the actual refrigerant temperature around the temperature sensor 61.

Next the process proceeds on to step S40 in which the refrigerant flowrate Rflow calculated in step S1 of the main routine shown in FIG. 6 is read. Then an intake pressure Ps of the compressor 2 is estimated based on Expressions (7) to (9) below from the evaporator pressure Pe estimated in step S39 and the refrigerant flowrate Rflow read in step S40.

$$\Delta PL = K_5 / 10^6 \times Rflow^2 \quad (7)$$

$$\Delta Ps = K_6 / 10^6 \times RfloW^1 \quad (8)$$

$$Ps = Pe - (\Delta PL + \Delta Ps) \geq Ps\min \quad (9)$$

where $\Delta PL$ is the refrigerant pressure loss in the refrigerant flow path from the detecting portion 67 of the temperature sensor 61 of the evaporator 6 to the evaporator outlet 65, $\Delta Ps$ is the refrigerant pressure loss from the evaporator outlet 65 to the inlet 222 of the compressor 2, $K_5$ and $K_6$ are constants of different values, and Pdmin is a lower limit value of the intake pressure. Incidentally, $\Delta PL + \Delta Ps$ in Expression (9) above represents the refrigerant pressure loss in the refrigerant flow path from the detecting portion 67 of the temperature sensor 61 of the evaporator 6 to the inlet 222 of the compressor 2. This pressure loss may also be calculated by a map that shows the relationship between the refrigerant flowrate Rflow and the pressure loss $\Delta PL + \Delta Ps$ shown in FIG. 13. In this map shown in FIG. 13, the pressure loss $\Delta PL + \Delta Ps$ is set to increase as the refrigerant flowrate Rflow increases.

Here, the lower limit value Psmin is preferably set for the intake pressure Ps of the compressor 2 estimated as in step S40. The reason for this is that if the differential pressure sensor 72 malfunctions, for example, the error between the refrigerant flowrate Rflow estimated based on the detection output of that differential pressure sensor 72 and the actual refrigerant flowrate 72 will increase and it will become difficult to accurately estimate the intake pressure Ps of the compressor 2. In this case, the estimated intake pressure Ps tends to be estimated lower than it actually is so setting the lower limit value Pdmin for the estimated discharge pressure Pd beforehand can prevent the reliability from decreasing.

In this way, in the subroutine shown in FIG. 9, the fourth corrected fin temperature Tefin_E is calculated from the ON/OFF signal of the compressor 2 and the fin temperature detection value Tefin which is the actual detected value from the temperature sensor 61, and then the intake pressure Ps of the compressor 2 is estimated from this fourth corrected fin temperature Tefin_E and the refrigerant flowrate Rflow.

Next, the process of estimating the theoretical power Lth in step S4 shown in FIG. 6 will be described in detail.

The theoretical power Lth of the compressor 2 in step S4 is estimated based on the refrigerant flowrate Rflow calculated in step S1, the discharge pressure Pd of the compressor 2 estimated in step S2, and the intake pressure Ps estimated in step S3. More specifically, a variable Q is first calculated according to the map (FIG. 14) based on Expression (10) below from the refrigerant flowrate Rflow and the discharge pressure Pd.

$$Q=(Rflow/Pd)^{0.8} \quad (10)$$

where the variable Q is a physical quantity relating to the volume flowrate and is calculated by, for example, dividing the refrigerant flowrate Rflow which is the mass flowrate by the discharge pressure Pd of the compressor 2 that is related to the refrigerant density. Then, the theoretical power Lth of the compressor 2 is calculated based on Expression (11) below from the variable Q calculated from the map shown in FIG. 14, the discharge pressure Pd of the compressor 2 estimated in step S2, and the intake pressure Ps estimated in step S3.

$$Lth=K_7 \times ((Pd-Ps) \times Q)^2 + K_8 \times ((Pd-Ps) \times Q) \quad (11)$$

where $K_7$ and $K_8$ are constants of different values.

Next, the process of calculating the compressor efficiency ηad in step S5 will be described in detail. In this step S5, a variable B is first calculated according to a map for calculating the variable B in FIG. 15 that is based on Expressions (12) to (15), from the refrigerant flowrate Rflow calculated in step S1 and the discharge pressure Pd of the compressor 2 estimated in step S2. More specifically, if Rflow is less than a predetermined refrigerant flowrate $C_{Rflow}$, a variable A in Expression (12) is used. If, on the other hand, Rflow is equal to or greater than the predetermined refrigerant flowrate $C_{Rflow}$, the variable A in Expression (13) is used. If the discharge pressure Pd is less than a predetermined discharge pressure $C_{Pd}$, the variable B can be calculated by substituting the variable A derived from Expression (12) or (13) into Expression (14). If, on the other hand, the discharge pressure Pd is equal to or greater than the predetermined discharge pressure $C_{Pd}$, the variable B can be calculated by substituting the variable A derived from Expression (12) or (13) into Expression (15).

If Rflow<$C_{Rflow}$, then $$A=C_3-K_9/10^3 \times (C_{Rflow}-Rflow) \quad (12)$$

If Rflow≧$C_{Rflow}$, then $$A=C_3-K_{10}/10^3 \times (Rflow-C_{Rflow}) \quad (13)$$

If Pd<$C_{Pd}$, then $$B=A-(C_4-Pd) \times K_{11}/10^3 \quad (14)$$

If Pd≧$C_{Pd}$, then $$B=A-(Pd-C_4) \times K_{12}/10^2 \quad (15)$$

where $C_3$, $C_4$, $K_9$, $K_{10}$, $K_{11}$, and $K_{12}$ are constants each of which is a different value, $C_{Rflow}$ is a constant that indicates a predetermined refrigerant flowrate in which the behavior of the variable B related to the compressor efficiency changes before and after this refrigerant flowrate $C_{Rflow}$, and $C_{Pd}$ is a constant that indicates a predetermined discharge pressure in which the behavior of the variable B related to the compressor efficiency changes before and after this discharge pressure $C_{Pd}$.

Just how the behavior of the variable B related to the compressor efficiency changes in before and after the predetermined refrigerant flowrate $C_{Rflow}$ and the predetermined discharge pressure $C_{Pd}$ will now be described in detail. As shown in FIG. 15, when the refrigerant flowrate Rflow is less than the predetermined flowrate $C_{Rflow}$, the slope of the straight line of the variable B related to the compressor efficiency is greater than it is when the refrigerant flowrate Rflow is larger than the predetermined refrigerant flowrate $C_{Rflow}$. This indicates that the compressor efficiency ηad when the refrigerant flowrate Rflow is low is worse when the refrigerant flowrate Rflow is less than the predetermined flowrate $C_{Rflow}$ than it is when the refrigerant flowrate Rflow is greater than the predetermined flowrate $C_{Rflow}$. This is because when the refrigerant flowrate Rflow is low, the discharge volume needs to be reduced by making the tilt angle of the swash plate 209 of the compressor 2 smaller, as shown in FIG. 3B, but at this time, discharge refrigerant of the compressor 2 needs to be introduced from the discharge chamber 216 into the control pressure chamber 204 through the capacity control valve 219 and the supply passage 220. That is, the discharge refrigerant from the compressor 2 is not only pumped to the evaporator 6 but also is consumed within the compressor 2. Therefor, the variable B is smaller when the discharge refrigerant is consumed within the compressor 2 than when the discharge refrigerant is only pumped to the evaporator 6 (i.e., the compressor efficiency ηad worsens). Also, the variable B is greater with the discharge pressure Pd2, which is discharge pressure that is the same as the predetermined discharge pressure $C_{Pd}$ of the compressor 2, than it is with the discharge pressure Pd1 that is smaller than the discharge pressure Pd2, and is smaller with the discharge pressure Pd3, which is greater than the discharge pressure Pd2, than it is with the discharge pressure Pd2. This means that the compressor 2 has a discharge pressure (i.e. the discharge pressure Pd2) at which refrigerant can be efficiently discharged when the compressor 2 is driven.

Next, the engine speed Ne detected by the engine speed sensor 12 of the engine 11 is obtained and the speed Nc of the compressor 2 is calculated using Expression (16) below.

$$Nc=Ne \times C_5 \quad (16)$$

where $C_5$ is a constant that represents the pulley ratio of the pulley 21.

Then the compressor efficiency ηad is calculated based on Expression (17) below from the variable B calculated earlier and the speed Nc of the compressor 2.

$$\eta ad=B-K_{13} \times 10^5 \times Nc \quad (17)$$

where $K_{13}$ is a constant. When the compressor speed Nc increases, so too does the friction within the compressor 2 so the compressor efficiency worsens. Therefore, the compressor efficiency ηad is calculated subtracting the term related to the compressor speed Nc from the variable B.

Next, the process of estimating the compressor torque Trq in step S6 will be described in detail. In step S6, the compressor torque Trq is calculated using Expression (18) below from the theoretical power Lth of the compressor 2 estimated in step S4, the compressor efficiency ηad calculated in step S5, and the compressor speed Nc.

$$Trq=(Lth/\eta ad) \times 60/(2\pi \times Nc) \times 1000 \quad (18)$$

In the example embodiment of the invention described above, the differential pressure ΔP before and after the orifice 71 changes as the actual refrigerant flowrate Rflow changes. In this example embodiment, the change in the actual refrigerant flowrate Rflow is detected as a change in the differential pressure ΔP before and after the orifice 71. The refrigerant flowrate Rflow is calculated based on the differential pressure ΔP detected directly by the differential pressure sensor 72, so the amount of fluctuation in the actual refrigerant flowrate Rflow can quickly be reflected in the calculation results of the refrigerant flowrate Rflow. As a result, the actual refrigerant flowrate Rflow can be accurately detected even if it suddenly fluctuates when the intake pressure of the compressor fluctuates due to a change in the temperature of the evaporator 6 or when refrigerant is unable to be suitably discharged by moving the swash plate 209 due to the pressure in the control pressure chamber 204 of the compressor 2 increasing as a result of liquid refrigerant collecting in the control pressure chamber 204 as it does during startup of the compressor 2.

Also, the refrigerant flowrate can be converted to mass flowrate from the differential pressure ΔP related to the volume flowrate by the differential pressure ΔP detected by the differential pressure sensor 72, and the high pressure Ph detected by the high-pressure sensor 31 that detects the pressure in a high-pressure region that corresponds to the part of the refrigerant flow path from the compressor 2 to the expansion valve 6 in the refrigeration cycle apparatus 1.

Also, the high pressure Ph detected by the high-pressure sensor 31 is corrected using the refrigerant flowrate Rflow, so the discharge pressure Pd of the compressor 2 can be corrected to a value that takes into account the pressure loss that occurs in the refrigerant flow path from the discharge port of the compressor 2 to the location where the high-pressure sensor 31 is arranged. As a result, the estimation accuracy of the discharge pressure Pd can be improved. At this time, the discharge pressure Pd of the compressor 2 may be corrected so as to become larger when the refrigerant flowrate Rflow is large than when the refrigerant flowrate Rflow is small.

Also, the intake pressure Ps of the compressor 2 is estimated taking into account the pressure loss with respect to the evaporator pressure Pe that occurs in the refrigerant flow path from the detecting portion 67 of the temperature sensor 61 of the evaporator 6 to the inlet 222 of the compressor 2, and that based on the refrigerant flowrate Rflow, so the estimation accuracy of the intake pressure Ps improves.

Also, the refrigerant flowrate Rflow, which is based on the differential pressure ΔP detected directly by the differential pressure sensor 72, is used as the refrigerant flowrate Rflow that is used to correct the discharge pressure Pd and the intake pressure Ps of the compressor 2. As a result, the estimation accuracy of the discharge pressure Pd and the intake pressure Ps improve even more.

Further, the lower limit values Pdmin and Psmin are set for the estimated discharge pressure Pd and the estimated intake pressure Psmin, respectively, so even if the refrigerant flowrate Rflow calculated from the differential pressure ΔP is an abnormal value due to a malfunction of the differential pressure sensor 72, the reliability of the estimated discharge pressure Pd and the estimated intake pressure Ps will not decrease.

Also, the intake pressure Ps of the compressor 2 is estimated from the value related to the fin temperature Tefin of the temperature sensor 61 of the evaporator 6. As a result, it is not necessary to provided a low-pressure sensor that directly detects the refrigerant pressure in the refrigerant flow path from the evaporator 6 to the inlet 222 of the compressor 2 (i.e., in the low pressure region of the refrigerant flow path of the refrigeration cycle apparatus 1), so the number of parts can be reduced.

Further, the first corrected fin temperature Tefin_A, in which the detection delay of the refrigerant temperature due to the heat capacity of the temperature sensor 61 itself has been corrected, can be calculated by using the current value Tefin of the actual fin temperature detection value Tefin of the temperature sensor 61 and the fin temperature detection value Tefin_old detected a predetermined period of time Δt before the current value Tefin as the fin temperature of the temperature sensor 61 used to estimate the intake pressure Ps of the compressor 2. Accordingly, the difference between i) the fin temperature from the time the compressor 2 is started up until the temperature of the evaporator 6 becomes somewhat stable and ii) the actual refrigerant temperature near the temperature sensor 61 can be reduced.

Moreover, the second corrected fin temperature Tefin_C, in which the detection delay of the refrigerant temperature due to the heat capacity of the evaporator 6 itself has been corrected, can be calculated by using the first corrected fin temperature Tefin_A before the predetermined period of time Δt and the predicted fin temperature Tefin_B that is predicted after a predetermined period of time has passed after startup of the compressor 2 as the fin temperature of the temperature sensor 61 used to estimate the intake pressure Ps of the compressor 2. Accordingly, the difference between the fin temperature immediately after startup of the compressor 2 and the actual refrigerant temperature near the temperature sensor 61 can be reduced.

Also, the third corrected fin temperature Tefin_D can be calculated so that it comes close to the second corrected fin temperature Tefin_C immediately after startup of the compressor 2 and ultimately comes close to the first corrected fin temperature Tefin_A by smoothing the first corrected fin temperature Tefin_A and the second corrected fin temperature Tefin_C. Accordingly, the difference in the behaviors of the fin temperature immediately after startup of the compressor 2 and the actual refrigerant temperature near the temperature sensor 61 can be reduced and discontinuity in the values of the first corrected fin temperature Tefin_A and the second corrected fin temperature Tefin_C can be smoothed so that the values are continuous.

Further, the evaporator pressure Pe is estimated using either the first corrected fin temperature Tefin_A or the third corrected fin temperature Tefin_D, whichever is smaller, as the fin temperature of the temperature sensor 61 used to estimate the intake pressure Ps of the compressor 2, so the estimation accuracy of the evaporator pressure Pe improves.

Also, the theoretical power Lth of the compressor 2 is estimated using the refrigerant flowrate Rflow and the discharge pressure Pd and intake pressure Ps of the compressor 2 estimated in this way, so the estimation accuracy of the theoretical power Lth of the compressor 2 improves.

Also, when the compressor torque Trq of the compressor 2 is estimated, it is done so taking the compressor efficiency ηad and the theoretical power Lth of the compressor 2 into account. Applying the compressor torque Trq estimated in this way to the output control of the engine 11 enables output control of the engine appropriate for the operating state of the compressor 2 to be suitably performed, which contributes to less fuel consumption of the vehicle. For example, when idling, unstable operation or even stopping of the engine 11 can be prevented by performing idle-up control on the output of the engine 11 by increasing the engine speed just enough to generate the estimated compressor torque Trq required to drive the compressor 2.

Also, the compressor efficiency ηad is calculated taking into account the refrigerant flowrate Rflow, the discharge pressure Pd, and the compressor speed Nc. Therefore, a compressor efficiency ηad can be calculated that also takes into account i) a decrease in compressor efficiency due to discharge refrigerant leaking into the control pressure chamber 204 of the compressor 2 as a result of a low refrigerant flowrate Rflow, ii) a change in the compressor efficiency based on the discharge state of the compressor 2 itself, and iii)

friction loss in the compressor 2 that accompanies rotation of the compressor 2. Using this compressor efficiency ηad to estimate the compressor torque Trq enables the estimation accuracy of the compressor torque Trq to be improved even more.

While the invention has been described with reference to example embodiments thereof, it is to be understood that the invention is not limited to the example embodiments or constructions. The example embodiments described above are only examples. That is, the invention is intended to cover various modifications and equivalent arrangements.

For example, the differential pressure detecting mechanism 7 is arranged between the compressor 2 and the condenser 3. However, the differential pressure detecting mechanism 7 may also be provided in another location as long as it is in the high-pressure region (i.e., the region between the discharge port of the compressor 2 and the expansion valve 5) of the refrigeration cycle apparatus 1. Also, in the example embodiment described above, the high-pressure sensor 31 is arranged immediately after the outlet of the condenser 3. However, the high-pressure sensor 31 may also be provided in another location as long as it is in the high-pressure region of the refrigeration cycle apparatus 1.

Also, the high pressure Ph directly detected by the high-pressure sensor 31 provided in the high-pressure region of the refrigeration cycle apparatus 1 may also be used as the discharge pressure Pd of the compressor 2. Also, a low-pressure sensor may be provided in a low-pressure region of the refrigeration cycle apparatus 1 and a value directly detected by that low-pressure sensor may be used as the intake pressure Ps of the compressor 2.

Also, an evaporator pressure sensor may be provided on the evaporator 6 and the value directly detected by this evaporator pressure sensor may be used as the pressure Pe of the evaporator 6.

Also, in the example embodiment described above, the evaporator pressure Pe is estimated using the fourth corrected fin temperature Tefin_E, but it does not have to be the fourth corrected fin temperature Tefin_E. For example, the evaporator pressure Pe may also be estimated using the first corrected fin temperature Tefin_A, the second corrected fin temperature Tefin_C, or the third corrected fin temperature Tefin_D, although the estimation accuracy may fall slightly compared to when the fourth corrected fin temperature Tefin_E is used.

Also, in FIG. 9, the ON/OFF signal of the compressor 2 is used until the compressor intake pressure Ps is estimated. However, the any kind of signal may be used as long as it is a signal corresponding to a startup condition of the compressor 2. For example, an ON/OFF signal of current supplied to the electromagnetic clutch 23 of the compressor 2 may be used, or a signal of a switch (air-conditioning switch) for turning the air-conditioning system on and off may be used.

Also, in the example embodiment described above, the calculation and estimation processes are performed using maps and operational expressions. However, they may also be performed using operational expressions or tables corresponding to the maps, or approximate expressions that approximate the operational expressions.

Moreover, a theoretical efficiency determined in advance may also be used as the efficiency ηad of the compressor 2.

What is claimed is:

1. A refrigeration cycle apparatus comprising:
   a compressor which compresses and discharges refrigerant that has been drawn in the compressor;
   a condenser that condenses the refrigerant discharged from the compressor;
   a pressure-reducing mechanism that reduces the pressure of the refrigerant from the condenser by expanding the refrigerant;
   an evaporator that evaporates the refrigerant from the pressure-reducing mechanism;
   an orifice formed in a refrigerant flow path from the compressor to the pressure-reducing mechanism in the refrigeration cycle apparatus;
   a differential pressure sensor that detects differential pressure before and after the orifice;
   a refrigerant flowrate calculating portion that calculates a refrigerant flowrate based on the differential pressure detected by the differential pressure sensor; and
   a torque estimating portion that estimates the torque required to drive the compressor based on the refrigerant flowrate calculated by the refrigerant flowrate calculating portion, the intake pressure of the compressor, and the discharge pressure of the compressor.

2. The refrigeration cycle apparatus according to claim 1, further comprising:
   a high-pressure sensor which detects the refrigerant pressure, and which is provided in the refrigerant flow path from the compressor to the pressure-reducing mechanism in the refrigeration cycle apparatus,
   wherein the refrigerant flowrate calculating portion calculates the refrigerant flowrate based on the differential pressure detected by the differential pressure sensor and the refrigerant pressure detected by the high-pressure sensor.

3. The refrigeration cycle apparatus according to claim 1, further comprising:
   a discharge pressure estimating portion that estimates the discharge pressure of the compressor based on the refrigerant flowrate calculated by the refrigerant flowrate calculating portion and the refrigerant pressure detected by the high-pressure sensor.

4. The refrigeration cycle apparatus according to claim 3, wherein
   the discharge pressure estimating portion corrects the discharge pressure to be larger when the refrigerant flowrate is large than when the refrigerant flowrate is small.

5. The refrigeration cycle apparatus according to claim 1, wherein
   the orifice is formed in the refrigerant flow path between the compressor and the condenser.

6. The refrigeration cycle apparatus according to claim 3, wherein
   a lower limit value is set for the discharge pressure of the compressor estimated by the discharge pressure estimating portion.

7. The refrigeration cycle apparatus according to claim 1, further comprising:
   an intake pressure estimating portion that estimates the intake pressure of the compressor based on the refrigerant flowrate calculated by the refrigerant flowrate calculating portion and the refrigerant pressure of the evaporator.

8. The refrigeration cycle apparatus according to claim 7, wherein
   a lower limit value is set for the intake pressure of the compressor estimated by the intake pressure estimating portion.

9. The refrigeration cycle apparatus according to claim 7, further comprising:
   a temperature sensor that detects the temperature of the evaporator; and an evaporator pressure estimating portion that estimates the refrigerant pressure of the evaporator based on the evaporator temperature detected by the temperature sensor.

10. The refrigeration cycle apparatus according to claim 9, wherein
the temperature sensor is a fin temperature sensor that detects the temperature of a fin of the evaporator.

11. The refrigeration cycle apparatus according to claim 10, further comprising:
a first corrected fin temperature calculating portion that calculates a first corrected fin temperature from an actual fin temperature detection value currently detected by the fin temperature sensor and an actual fin temperature detected value detected a predetermined period of time earlier when the actual fin temperature detection value currently detected.

12. The refrigeration cycle apparatus according to claim 11, further comprising:
a compressor state detecting sensor that detects a start/stop state of the compressor;
a predicted fin temperature calculating portion that calculates a predicted fin temperature based on the first corrected fin temperature, wherein the predicted fin temperature is the fin temperature that is predicted to decrease until a predetermined period of time has passed after startup of the compressor, when the compressor state detecting sensor detects that the compressor has been started; and
a second corrected fin temperature calculating portion that calculates a second corrected fin temperature based on the first corrected fin temperature and the predicted fin temperature.

13. The refrigeration cycle apparatus according to claim 12, further comprising:
a third corrected fin temperature calculating portion that calculates a third corrected fin temperature by smoothing the first corrected fin temperature and the second corrected fin temperature,
wherein the third corrected fin temperature is a value that is closer to the second corrected fin temperature than the first corrected fin temperature immediately after startup of the compressor, and that approaches the first corrected fin temperature from the second corrected fin temperature as time passes after startup of the compressor.

14. The refrigeration cycle apparatus according to claim 13, further comprising:
a fourth corrected fin temperature calculating portion that determines a fourth corrected fin temperature by selecting the smaller fin temperature from among the first corrected fin temperature and the third corrected fin temperature.

15. The refrigeration cycle apparatus according to claim 1, further comprising:
an efficiency calculating portion that calculates the efficiency of the compressor,
wherein the torque estimating portion corrects the estimated torque required to drive the compressor based on the efficiency of the compressor.

16. The refrigeration cycle apparatus according to claim 15, wherein
the efficiency calculating portion calculates the efficiency of the compressor to be higher when the refrigerant flowrate calculated by the refrigerant flowrate calculating portion is large than when the refrigerant flowrate is small.

17. The refrigeration cycle apparatus according to claim 15, wherein
the efficiency calculating portion calculates the efficiency of the compressor based on the discharge pressure.

18. The refrigeration cycle apparatus according to claim 15, wherein
the efficiency calculating portion calculates the efficiency to be higher when the speed of the compressor is low than when the speed of the compressor is high.

19. The refrigeration cycle apparatus according to claim 1, wherein
the differential pressure sensor includes:
a pressure detecting chamber;
a spool member to which a permanent magnet is attached and which is provided inside the pressure detecting chamber in a manner so as to move according to differential pressure before and after the orifice;
a magnetic sensor provided in a position facing the permanent magnet when the spool member is arranged in the pressure detecting chamber; and
a first pressure detecting chamber and a second pressure detecting chamber formed by the pressure detecting chamber being divided when the spool member is arranged in the pressure detecting chamber,
wherein the first pressure detecting chamber is connected to the refrigerant flow path that is located upstream of the orifice, and the second pressure detecting chamber is connected to the refrigerant flow path that is located downstream of the orifice.

20. The refrigeration cycle apparatus according to claim 1, wherein the differential pressure mechanism sensor includes:
a spool member to which a permanent magnet is attached;
a pressure detecting chamber;
a first pressure detecting chamber and a second pressure detecting chamber formed by the pressure detecting chamber being divided by the spool member being arranged in the pressure detecting chamber; and
a magnetic sensor provided in a position facing the permanent magnet when the spool member is arranged in the pressure detecting chamber.

21. A refrigeration cycle apparatus comprising:
a compressor which compresses and discharges refrigerant that has been drawn in the compressor;
a condenser that condenses the refrigerant discharged from the compressor;
a pressure-reducing mechanism that reduces the pressure of the refrigerant from the condenser by expanding the refrigerant;
an evaporator that evaporates the refrigerant from the pressure-reducing mechanism;
a high-pressure sensor which detects the refrigerant pressure, and which is provided in a refrigerant flow path from the compressor to the pressure-reducing mechanism in the refrigeration cycle apparatus;
a discharge pressure estimating portion that estimates the discharge pressure of the compressor based on the refrigerant pressure detected by the high-pressure sensor and a refrigerant flowrate; and
a torque estimating portion that estimates the torque required to drive the compressor based on the estimated discharge pressure estimated by the discharge pressure estimating portion, the intake pressure of the compressor, and the refrigerant flowrate.

22. The refrigeration cycle apparatus according to claim 21, further comprising:

an orifice formed in the refrigerant flow path from the compressor to the pressure-reducing mechanism in the refrigeration cycle apparatus;

a differential pressure sensor that detects differential pressure before and after the orifice; and a refrigerant flowrate calculating portion that calculates a refrigerant flowrate based on the differential pressure detected by the differential pressure sensor.

* * * * *